US010401716B2

(12) United States Patent
Edwards et al.

(10) Patent No.: US 10,401,716 B2
(45) Date of Patent: Sep. 3, 2019

(54) CALIBRATION OF PROJECTION SYSTEMS

(71) Applicant: CANON KABUSHIKI KAISHA, Tokyo (JP)

(72) Inventors: Cameron Murray Edwards, Clovelly (AU); Eric Wai Shing Chong, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/155,562

(22) Filed: Oct. 9, 2018

(65) Prior Publication Data
US 2019/0121224 A1    Apr. 25, 2019

(30) Foreign Application Priority Data

Oct. 24, 2017   (AU) ................. 2017251725

(51) Int. Cl.
*G03B 21/14*     (2006.01)
*G03B 37/04*     (2006.01)
(Continued)

(52) U.S. Cl.
CPC ........... *G03B 21/142* (2013.01); *G03B 37/04* (2013.01); *G09G 3/002* (2013.01); *G09G 3/02* (2013.01);
(Continued)

(58) Field of Classification Search
CPC ........ G03B 21/142; G03B 37/04; H04N 5/74; H04N 9/3147; H04N 9/3194;
(Continued)

(56) References Cited

U.S. PATENT DOCUMENTS 6,222,593 B1    4/2001  Higurashi et al.
6,527,395 B1 *  3/2003  Raskar ................. G03B 21/14
                                                              353/70
(Continued)

OTHER PUBLICATIONS

Andrew Raij, et al., "Auto-Calibration of Multi-Projector Display Walls", Department of Computer Science, University of North Carolina at Chapel Hill, Sep. 2004.
(Continued)

*Primary Examiner* — Brian P Yenke
(74) *Attorney, Agent, or Firm* — Canon U.S.A., Inc. IP Division

(57) ABSTRACT

A method for calibrating a projection system having a plurality of projectors, and a camera. The method comprises the camera capturing an image of a calibration pattern projected on to a projection surface by a first projector of the plurality of projectors; determining a projective reconstruction using corresponding points between pixels in the captured image and pixels in the projected calibration pattern; and determining a set of solutions for intrinsic parameters of the first projector, the set of solutions converting the projective reconstruction to a Euclidean reconstruction based on minimization of reprojection error between the camera and the first projector. The method also comprises determining intrinsic parameters of the first projector by selecting the intrinsic parameters from the set of solutions according to a reprojection error with respect to another projector; and applying the selected intrinsic parameters to determine a Euclidean reconstruction of the projection surface.

16 Claims, 11 Drawing Sheets

(51) Int. Cl.
  *H04N 5/74* (2006.01)
  *H04N 9/31* (2006.01)
  *H04N 17/04* (2006.01)
  *G09G 3/00* (2006.01)
  *G09G 3/02* (2006.01)

(52) U.S. Cl.
  CPC ............ *H04N 5/74* (2013.01); *H04N 9/3147* (2013.01); *H04N 9/3194* (2013.01); *H04N 17/045* (2013.01)

(58) Field of Classification Search
  CPC ...... H04N 9/3185; H04N 17/045; G06T 7/80; G06T 7/10; G06T 7/30
  See application file for complete search history.

(56) References Cited

U.S. PATENT DOCUMENTS

| | | | |
|---|---|---|---|
| 7,175,285 B2 | 2/2007 | Li et al. | |
| 7,215,362 B2 | 5/2007 | Klose | |
| 7,347,564 B2 | 3/2008 | Matsumoto et al. | |
| 8,020,997 B2 | 9/2011 | Aufranc et al. | |
| 8,172,407 B2* | 5/2012 | Lim | G06K 9/2036 353/69 |
| 8,401,276 B1* | 3/2013 | Choe | G01C 11/06 382/154 |
| 8,491,128 B2 | 7/2013 | Wu et al. | |
| 8,662,676 B1 | 3/2014 | Chang et al. | |
| 9,202,278 B2* | 12/2015 | Jin | G06T 7/20 |
| 9,369,683 B2* | 6/2016 | Timoner | G06T 5/006 |
| 9,398,278 B2 | 7/2016 | Chao | |
| 9,578,295 B1* | 2/2017 | Morrison | H04N 9/3185 |
| 9,807,359 B1* | 10/2017 | Moule | H04N 9/3185 |
| 9,860,494 B2* | 1/2018 | Johnson | G03B 21/13 |
| 9,961,317 B2* | 5/2018 | Morrison | H04N 9/3147 |
| 2003/0091227 A1* | 5/2003 | Chang | G06T 17/10 382/154 |
| 2009/0097039 A1* | 4/2009 | Kawasaki | G01B 11/2509 356/603 |
| 2012/0098937 A1 | 4/2012 | Sajadi et al. | |
| 2012/0120372 A1 | 5/2012 | Timoner et al. | |
| 2013/0044186 A1* | 2/2013 | Jin | G06T 7/20 348/46 |
| 2014/0313423 A1 | 10/2014 | Johnson et al. | |
| 2017/0103509 A1 | 4/2017 | Scharfenberger et al. | |
| 2017/0294009 A1* | 10/2017 | Pollard | G06T 7/80 |
| 2018/0143008 A1* | 5/2018 | Morrison | H04N 5/247 |
| 2019/0052851 A1* | 2/2019 | Korl | H04N 9/317 |

OTHER PUBLICATIONS

Behzad Sajadi, et al., "Auto-Calibration of Cylindrical Multi-Projector Systems", Department of Computer Science University of California, Irvine, Apr. 2010.

Stuart B. Heinrich, et al., "Robust Maximum Likelihood Structure Invariant Merging of Projective Reconstructions", Department of Electrical and Computer Engineering, NC State University, Box 7911, Raleigh, NC 27695-7911, submitted Feb. 2011.

Riccardo Gherardi, et al., "Practical Autocalibration", Dec. 2010.

Richard I. Hartley, et al., "Triangulation", Computer Vision and Image Understanding vol. 68, No. 2, Article No. IV970547, pp. 146-157, Nov. 1997.

Stuart B. Heinrich, et al., "Maximum Likelihood Autocalibration", Image and Vision Computing, vol. 29, Issue 10, pp. 653-665, Sep. 2011.

Falcao, G. et al., "Plane-based calibration of a projector-camera system", VIBOT Master 2008, 9(1), pp. 1-12.

Draréni, J. et al., "Methods for geometrical video projector calibration", Machine Vision and Applications (2012) Published online: Mar. 12, 2011, 23(1):79-89.

Huang, Z. et al., "Accurate projector calibration based on a new point-to-point mapping relationship between the camera and projector images", Applied Optics, Jan. 20, 2015; vol. 54, No. 3, pp. 347-356.

Mosnier, J. et al., "A New Method for Projector Calibration Based on Visual Servoing", MVA2009 IAPR Conference on Machine Vision Applications, May 20-22, 2009, Yokohama, Japan, pp. 25-29.

\* cited by examiner

CALIBRATION OF PROJECTION SYSTEMS

REFERENCE TO RELATED PATENT APPLICATION(S)

This application claims the benefit under 35 U.S.C. § 119 of the filing date of Australian Patent Application No. 2017251725, filed 24 Oct. 2017, hereby incorporated by reference in its entirety as if fully set forth herein.

TECHNICAL FIELD

The present disclosure relates to the field of alignment for projective devices (also known as pinhole devices) including cameras and projectors and in particular to a system and method of calibrating projection systems, for example by the generation of alignment calibration parameters for a pinhole device that is added to an existing set of aligned pinhole devices.

BACKGROUND

Projective devices such as cameras, projectors and the like are used pervasively within the imaging industry. Projective devices are increasingly used in collections. For example, projectors are arranged in an array or other configuration to enable wide area display of image and video content onto surfaces of arbitrary shapes. Similarly, arrays of cameras have found application in computational cameras where the output of each camera is computed based on the total set of camera views captured. Such systems offer great scalability in that the systems can be added to in accordance with changing requirements or improving technology. Collective systems also offer redundancy which can improve reliability in the event of failure of a single device. Mixed collections of projective devices are also useful. One example is the automatic keystone correction of projector display where a camera is used to obtain a view of the projected image and image processing is used to pre-warp the projected image so that the projected image is displayed rectified to the projection surface.

A significant obstacle in the use of collections of projective devices is calibration of the collection to act as a single unit. While many techniques exist, most of the existing techniques place special constraints on the physical configuration of the collection and may require additional use of calibration aids. Requiring addition calibration aids creates an unacceptable technical obstacle to many end users and, as a result, such collections of projective devices must be installed and maintained by technical experts.

One known technique requires the user to establish point correspondences between the projective image planes of multiple projector devices manually. Given 2 overlapping projection areas, the user first manually chooses a point in the overlap region within the first projector image, and then manually searches and selects a corresponding point within the second projector image.

Another known system provides for automatic keystone correction of a single projector based on analysis of a camera image of the projection area. However, the exact relative pose of the camera and projector is required. If the camera and projector are present as separate physical objects then the relative pose must be determined through the use of charts or other calibration devices. The calibration would need to be performed each time the devices moved relative to each other. The resulting process can become cumbersome and unreliable for an end user.

Device calibration process typically results in several intrinsic parameters of the device. Intrinsic parameters include focal length, principal point, and lens distortion parameters. One known automatic projector calibration method minimises a cost function based on evaluation of circular point constraints in the image planes of three or more projectors. However, the method makes assumptions about the location of the principal point. The assumptions do not hold when the projector has lens shift capabilities which shift the position of the projector's principal point. Other methods rely on an initial projector calibration having been performed, which is not guaranteed in many situations. Yet other methods require multiple planar projection surfaces to be arranged in a known configuration.

SUMMARY

It is an object of the present invention to substantially overcome, or at least ameliorate, at least one disadvantage of present arrangements.

On aspect of the present disclosure provides a computer-implemented method of calibrating a projection system having a plurality of projectors, and an image capture device, the method comprising the steps of: capturing, using the image capture device, an image of a calibration pattern projected on to a projection surface by a first projector of the plurality of projectors; determining a projective reconstruction using a set of corresponding points between pixels in the captured image and pixels in the calibration pattern projected by the first projector; determining a set of solutions for intrinsic parameters of the first projector, the set of solutions converting the determined projective reconstruction to a candidate Euclidean reconstruction based on minimisation of reprojection error between the image capture device and the first projector, the reprojection error being determined using the set of corresponding points; determining intrinsic parameters of the first projector by selecting the intrinsic parameters from the identified set of solutions according to a reprojection error with respect to a second projector; and applying the selected intrinsic parameters to determine a Euclidean reconstruction of the projection surface to calibrate the projection system.

According to another aspect, the reprojection error between the image capture device and the first projector relates to root mean square reprojection error in image planes of the image capture device and the first projector.

According to another aspect, the reprojection error of the first projector with respect to the second projector relates to error between (i) a reconstruction formed by the image capture device and first projector and (ii) a reconstruction formed by the image capture device and the second projector.

According to another aspect, selecting the intrinsic parameters from the identified set of solutions comprises initialising minimum and maximum focal length values of the set of solutions and an associated number of steps between the minimum and maximum focal length values.

According to another aspect, selecting the intrinsic parameters from the identified set of solutions further comprises determining a Euclidian reconstruction for each of a number of reconstructions, the number of reconstructions based on the minimum and maximum focal length values and the number of steps.

According to another aspect, coarse-to-fine sampling is performed between the minimum and maximum focal length values for a predetermined number of samples.

According to another aspect, selecting the intrinsic parameters from the identified set of solutions comprises determining a scale based on aligning a reconstruction for each of the set of solutions for the first projector with respect to a reconstruction of the second projector.

According to another aspect, selecting the intrinsic parameters from the identified set of solutions comprises, for overlapping projection regions of each of the first and second projectors, determining sets of corresponding points and determining a mean depth value.

According to another aspect, selecting the intrinsic parameters from the identified set of solutions comprises determining a reprojection cost for reconstructions for each of the set of solutions for the first projector with respect to a reconstruction of the second projector, the cost determined using a scale for aligning the reconstructions for each of the set of solutions with respect to the reconstruction of the second projector.

According to another aspect, determining the set of solutions comprises iteratively sampling an intrinsic parameter based on reprojection error between the image capture device and the first projector, and fitting the sampled parameters to a line.

According to another aspect, determining the set of solutions comprises determining a reference solution and determining a reprojection error associated with the reference solution.

According to another aspect, determining the set of solutions comprises determining a reference solution and determining a cheirality of the reference solution.

According to another aspect, determining the set of solutions is based on determining orthogonal vectors to a selected direction and iteratively sampling a plane position with respect to each determined vector.

Another aspect of the present disclosure provides a non-transitory computer readable medium having a computer program stored thereon to implement method of calibrating a projection system having a plurality of projectors, and an image capture device, the method comprising: capturing, using the image capture device, an image of a calibration pattern projected on to a projection surface by a first projector of the plurality of projectors; determining a projective reconstruction using a set of corresponding points between pixels in the captured image and pixels in the calibration pattern projected by the first projector; determining a set of solutions for intrinsic parameters of the first projector, the set of solutions converting the determined projective reconstruction to a candidate Euclidean reconstruction based on minimisation of reprojection error between the image capture device and the first projector, the reprojection error being determined using the set of corresponding points; determining intrinsic parameters of the first projector by selecting the intrinsic parameters from the identified set of solutions according to a reprojection error with respect to a second projector; and applying the selected intrinsic parameters to determine a Euclidean reconstruction of the projection surface to calibrate the projection system.

Another aspect of the present disclosure provides apparatus configured to calibrate a projection system having a plurality of projectors, and an image capture device, comprising: a memory; a processor configured to execute code stored on the memory to: receive, from the image capture device, an image of a calibration pattern projected on to a projection surface by a first projector of the plurality of projectors; determine a projective reconstruction using a set of corresponding points between pixels in the captured image and pixels in the calibration pattern projected by the first projector; determine a set of solutions for intrinsic parameters of the first projector, the set of solutions converting the determined projective reconstruction to a candidate Euclidean reconstruction based on minimisation of reprojection error between the image capture device and the first projector, the reprojection error being determined using the set of corresponding points; determine intrinsic parameters of the first projector by selecting the intrinsic parameters from the identified set of solutions according to a reprojection error with respect to a second projector; and apply the selected intrinsic parameters to determine a Euclidean reconstruction of the projection surface to calibrate the projection system.

Another aspect of the present disclosure provides a system, comprising: an image capture device; a plurality of projectors, the image capture device and the plurality of projectors forming a projection system; a memory; and a processor, wherein the processor is configured to execute code stored on the memory for implementing a method of calibrating the projection system, the method comprising: capturing, using the image capture device, an image of a calibration pattern projected on to a projection surface by a first projector of the plurality of projectors; determining a projective reconstruction using a set of corresponding points between pixels in the captured image and pixels in the calibration pattern projected by the first projector; determining a set of solutions for intrinsic parameters of the first projector, the set of solutions converting the determined projective reconstruction to a candidate Euclidean reconstruction based on minimisation of reprojection error between the image capture device and the first projector, the reprojection error being determined using the set of corresponding points; determining intrinsic parameters of the first projector by selecting the intrinsic parameters from the identified set of solutions according to a reprojection error with respect to a second projector; and applying the selected intrinsic parameters to determine a Euclidean reconstruction of the projection surface to calibrate the projection system.

Other aspects are also described

BRIEF DESCRIPTION OF THE DRAWINGS

One or more example embodiments of the disclosure will now be described with reference to the following drawings, in which.

DETAILED DESCRIPTION INCLUDING BEST MODE

Figure 1:
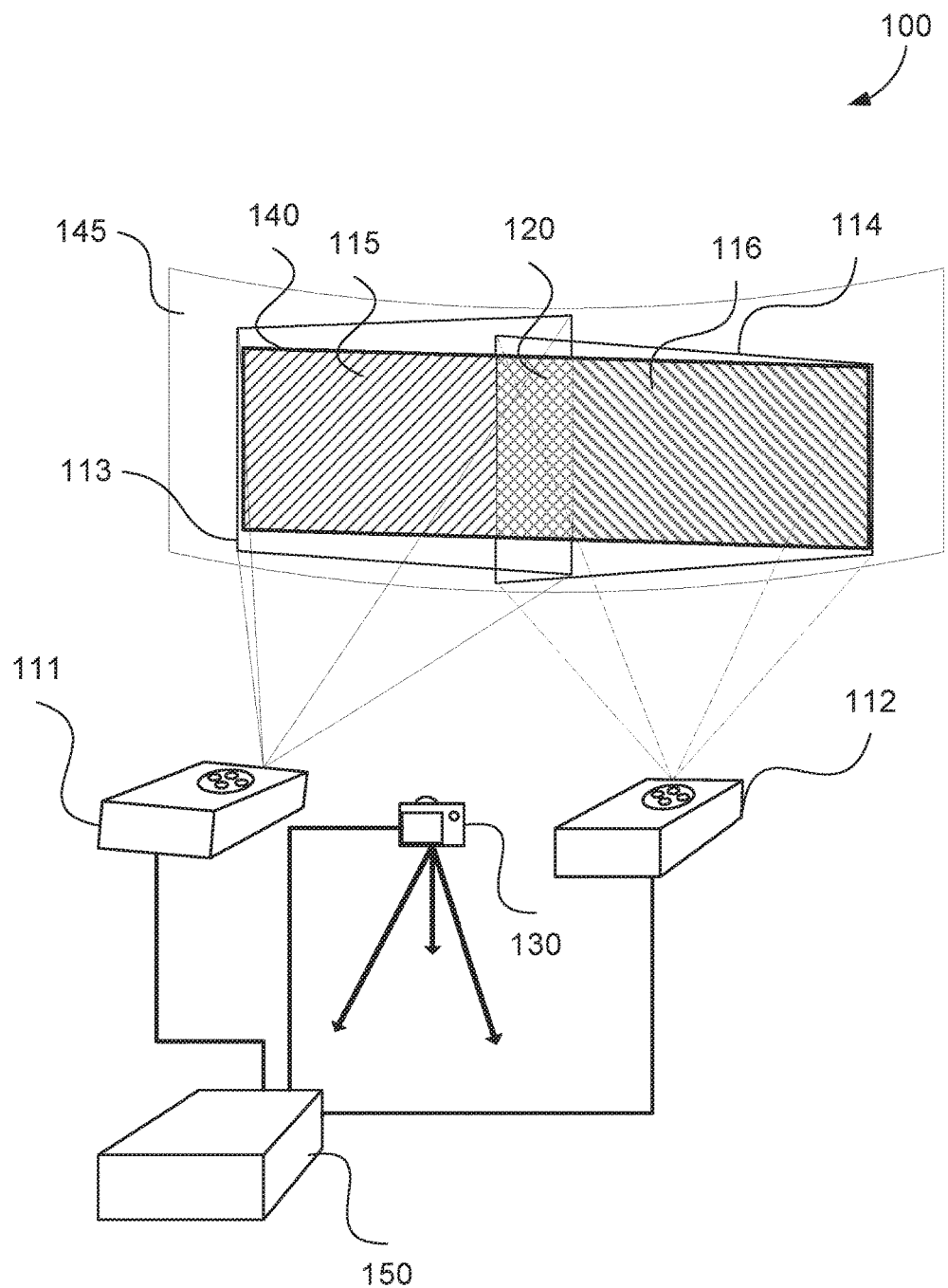
FIG. 1 shows a multi-projector arrangement.

Where reference is made in any one or more of the accompanying drawings to steps and/or features, which have the same reference numerals, those steps and/or features have for the purposes of this description the same function(s) or operation(s), unless the contrary intention appears.

The arrangements described herein provide simplified automatic calibration of one image capture or projective device based on a set of calibrated devices. The arrangements described are particularly well suited to the case where a single device from a previously calibrated array is to be changed, swapped out or otherwise modified in a way that would invalidate the existing calibration information of that device. The methods described operate to establish a constraint which is based on a measured set of corresponding points between first and second devices in a collection. The established constraint is insufficient to provide a calibration solution to a third (new) device which is being added to the collection. The constraint is used, in combination with re-projection error to determine (intrinsic) calibration parameters for the third device, allowing the third to be automatically integrated into the collection.

The methods of calibrating a projection system are described with reference to a specific example arrangement depicted in FIG. 1. The arrangement of FIG. 1 depicts a multi-projector system 100. Projectors 111 and 112 project images on to a projection screen surface 145. However, the arrangements described are equally applicable to calibrating an image capture system comprising multiple image capture devices, or to systems comprising combinations of image capture devices and projectors. The arrangements described relate to alignment of images but can be extended to relate to alignment for projection of video. The projection screen surface 145 is non-planar, for example cylindrical or spherical in geometry. The projectors 111 and 112 project on to projection areas 113 and 114 respectively. Projection alignment and overall image rectification is achieved using methods implemented on a projection controller 150. The projection controller obtains a view of a display area 140 on the projection screen surface 145 using a camera 130 and modifies a signal sent to each of the projectors 111 and 112 such that the first projector 111 projects a first portion 115 of an image and the second projector 112 projects a second portion 116 of the image. The determined first and second portions 115 and 116 are processed such that their projection onto the projection screen surface 145 is rectified with respect to the projection screen surface 145, generating the display area 140. The display area 140 is warped to the geometry of the projection screen surface 145. Further, the determined first and second portions 115 and 116 are processed such that the image content in an overlap area 120 is blended smoothly so that there is no visible discontinuity in the displayed image spatially, in colour or intensity.

The camera 130 may be any image capture device suitable for capturing images of a scene and for transmitting the captured image to the projection controller 150. In some arrangements the camera 130 may be integral to the projection controller 150 or one of the projection devices 111 and 112. The projectors 111 and 112 may be any projection devices suitable for projection against a surface such as a wall or a screen. In some arrangements one of the projectors 111 and 112 may be integral to the projection controller 150. While the arrangement of FIG. 1 depicts two projectors (111 and 112), arrangements that employ different numbers and configurations of projectors and cameras are possible.

Figure 2A:
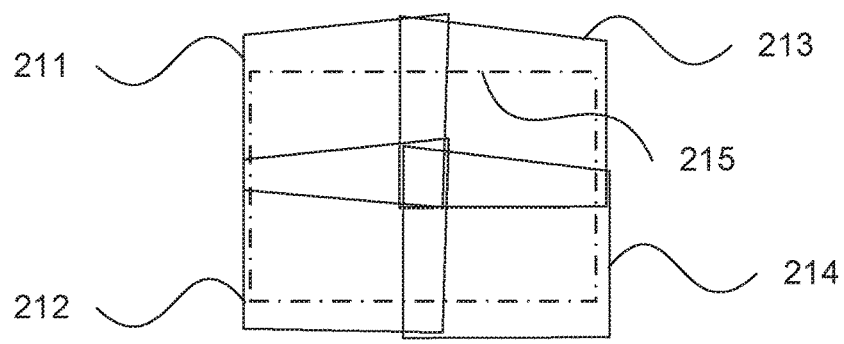
FIGS. 2A to 2C depict display areas for various multi-projector arrangements.
Figure 2B:
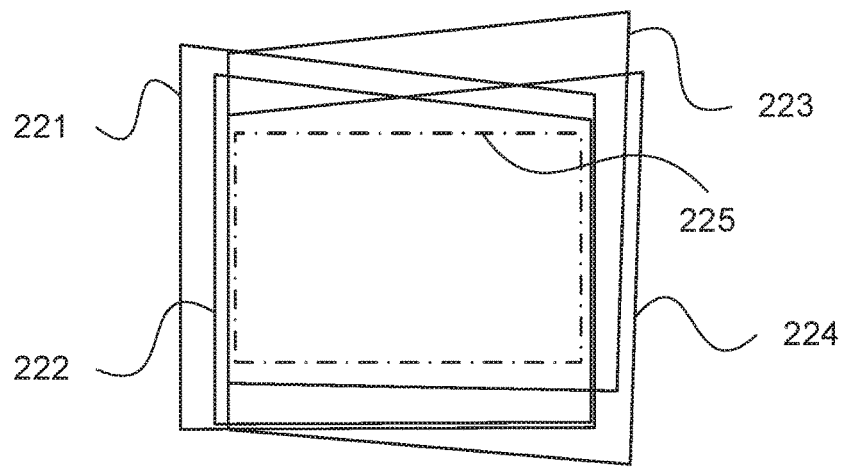
Figure 2C:
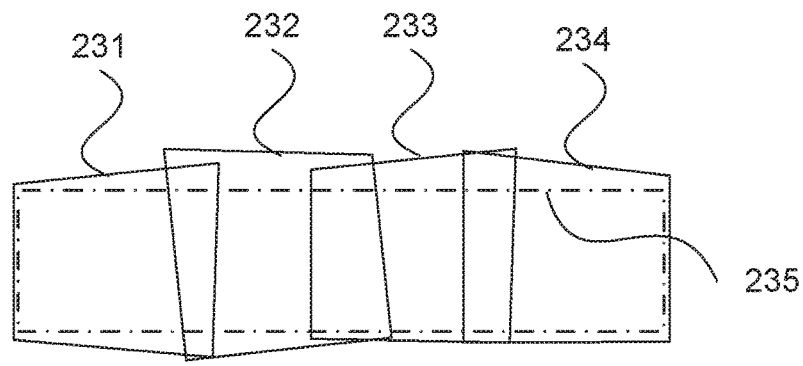

Some further examples utilising 4 projectors (not shown) are given in FIGS. 2A-2C. In FIG. 2A, four projection areas 211, 212, 213 and 214 are tiled in a 2×2 arrangement. The projection controller 150 drives the collection of four projectors to produce a reformed display area 215. The reformed display area 215 relates to an output image in which distortion due to perspective is minimised and warping due to calibration error is minimised, for example such that projected horizontal lines appear level and straight to a viewer. The arrangement of FIG. 2A is advantageous for increasing the resolution available for displaying image content. In FIG. 2B, four projection areas 221, 222, 223 and 224 are stacked in a 1×1 overlapped arrangement. The projection controller 150 drives the collection of four projectors to produce a reformed display area 225. The arrangement of FIG. 2B is advantageous for increasing brightness available for displaying projected image content. In a further example arrangement, depicted in FIG. 2C, four projection areas 231, 232, 233 and 234 are tiled in a 1×4 arrangement. The projection controller 150 drives the corresponding collection of four projectors to produce a reformed display area 235. The arrangement of FIG. 2C is advantageous for displaying very wide aspect or panoramic image content.

In each of the multi-projector arrangements described in FIGS. 1 and 2A to 2C, a number of common steps are required to generate the desired projected display. Firstly, calibration data of all the pinhole devices (for example, projectors) involved must be determined that allows the images sent to each projector to be matched in size as spatial alignment between the projected images and the projection screen surface must be determined. Secondly, the coverage of each projector must be understood with respect to the reformed display area so that an appropriate crop of the source video content can be generated. Due to the need to configure the projector and camera arrangement according to the installation, processing to determine calibration data and coverage must be performed after installation of the projection system and may be performed regularly after installation to re-establish correct display after physical disturbance of one or more projectors or the camera. A physical disturbance may arise due to movement of the installation or due to one or more items being independently moved or replaced. As such, physical disturbances may happen routinely. Hence it is important that the recalibration of the system can be carried out by an end user without specialised tools or technical skills. The projection controller 150 implements the projection methods described herein.

The projection controller 150 may be a standalone device or may be implemented as an embedded device and contained within one or more of the projectors 111 and 112. For simplicity and clarity, the projection controller 150 is implemented herein using a general purpose computer depicted in FIGS. 10 and 10B. The general purpose computer system is capable of driving a plurality of display devices.

Figure 10A:
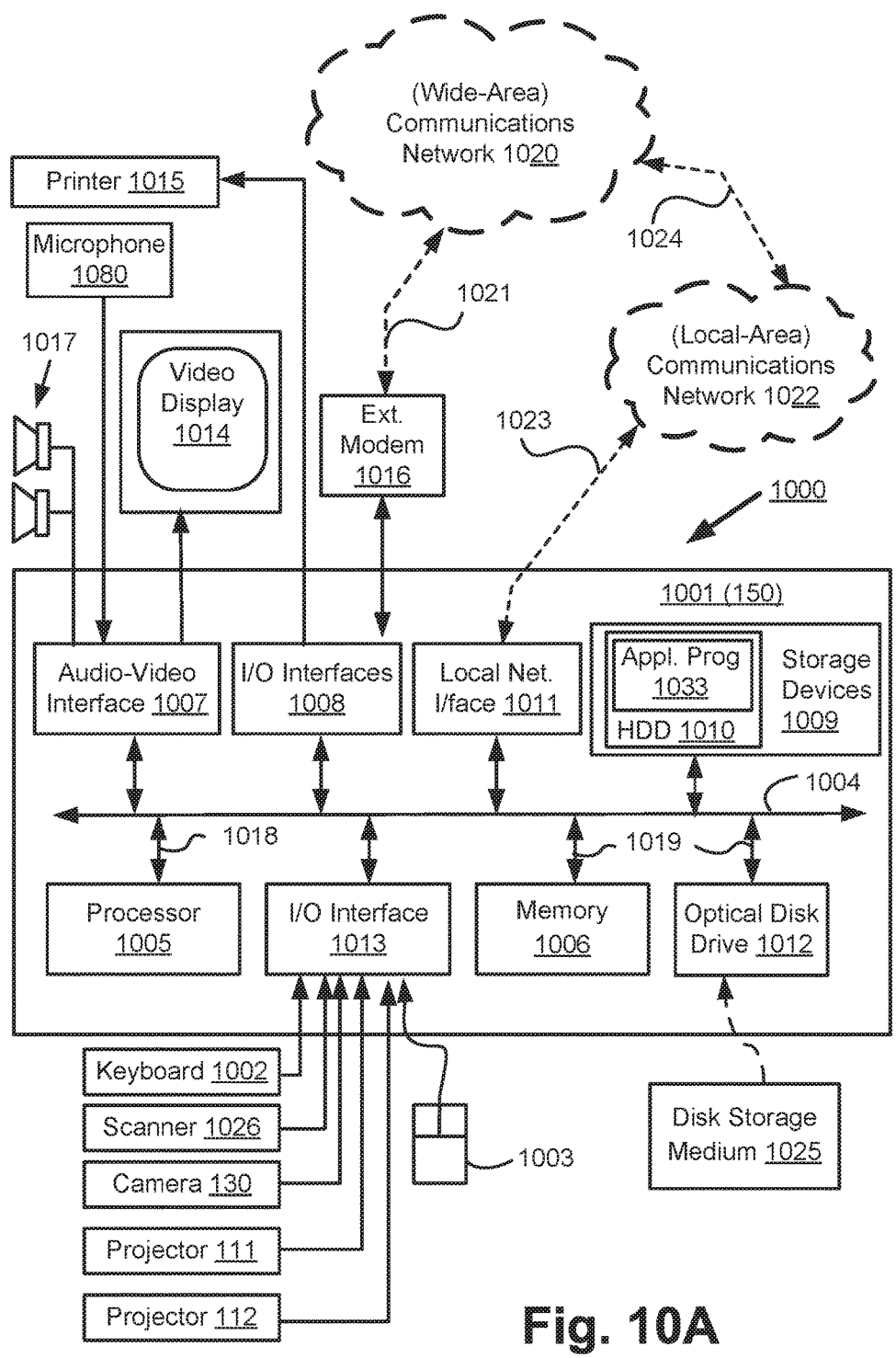
FIGS. 10A and 10B form a schematic block diagram of a general purpose computer system upon which arrangements described can be practiced.
Figure 10B:
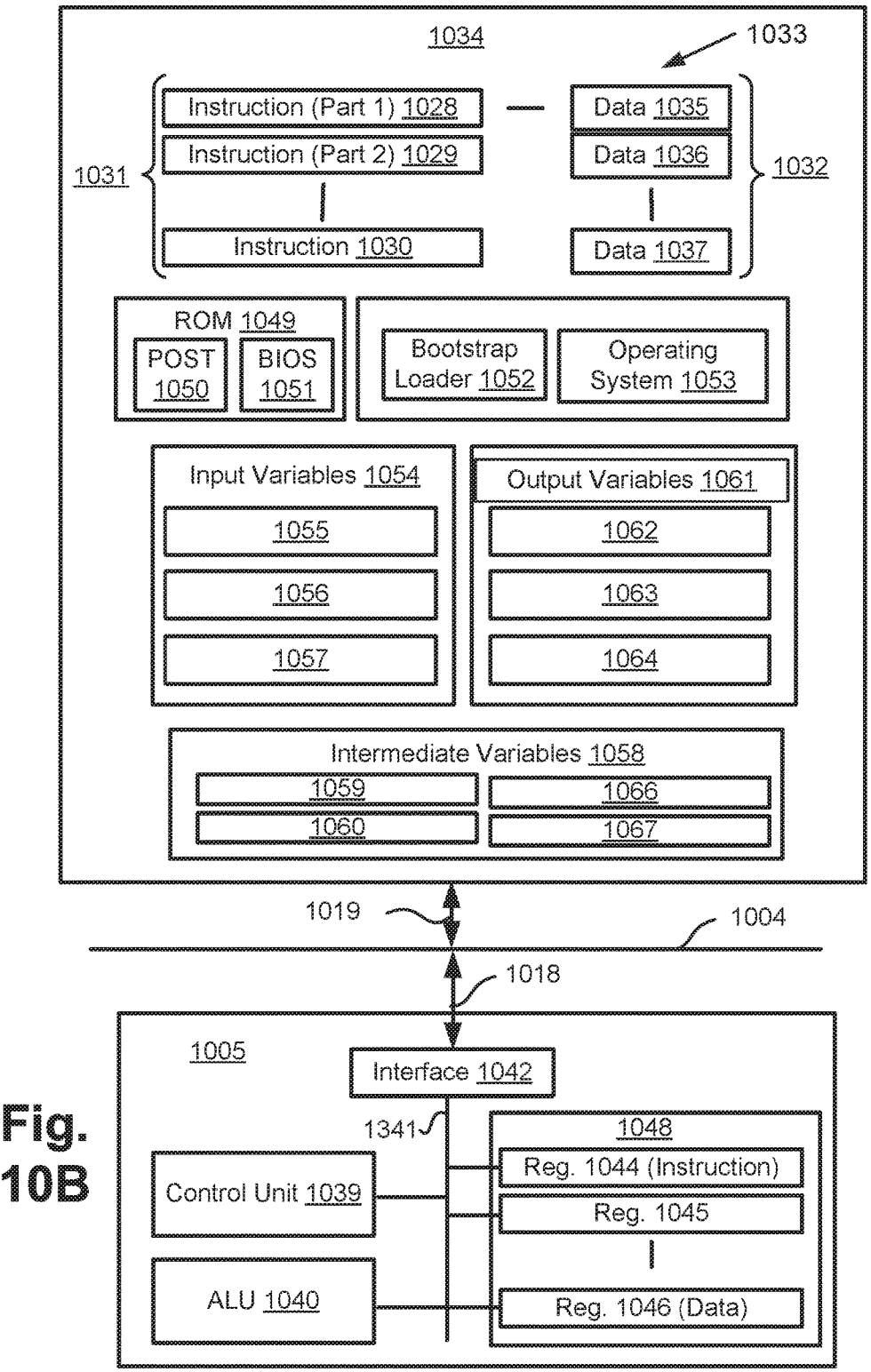

FIGS. 10A and 10B depict a general-purpose computer system 1000, upon which the various arrangements described can be practiced. The system 1000 corresponds to the system 100. A computer module 1001 of the system 1000 corresponds to the projection controller 150 of FIG. 1.

As seen in FIG. 10A, the computer system 1000 includes: the computer module 1001; input devices such as a keyboard 1002, a mouse pointer device 1003, a scanner 1026, a camera 1027, and a microphone 1080; and output devices including a printer 1015, a display device 1014 and loudspeakers 1017. An external Modulator-Demodulator (Modem) transceiver device 1016 may be used by the computer module 1001 for communicating to and from a communications network 1020 via a connection 1021. The communications network 1020 may be a wide-area network (WAN), such as the Internet, a cellular telecommunications network, or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the communications network 1020.

The computer module 1001 typically includes at least one processor unit 1005, and a memory unit 1006. For example, the memory unit 1006 may have semiconductor random access memory (RAM) and semiconductor read only memory (ROM). The computer module 1001 also includes a number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 1027 and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the computer system 1000 via a connection 1023 to a local-area communications network 1022, known as a Local Area Network (LAN). As illustrated in FIG. 10A, the local communications network 1022 may also couple to the wide network 1020 via a connection 1024, which would typically include a so-called "firewall" device or device of similar functionality. The local network interface 1011 may comprise an Ethernet circuit card, a Bluetooth® wireless arrangement or an IEEE 802.11 wireless arrangement; however, numerous other types of interfaces may be practiced for the interface 1011.

The I/O interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu-ray USB-RAM, portable, external hard drives, and floppy disks, for example, may be used as appropriate sources of data to the system 1000.

The components 1005 to 1013 of the computer module 1001 typically communicate via an interconnected bus 1004 and in a manner that results in a conventional mode of operation of the computer system 1000 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac™ or like computer systems.

The described methods of calibrating a projection system may be implemented using the computer system 1000 wherein the processes of FIGS. 4 and 6-9, to be described, may be implemented as one or more software application programs 1033 executable within the computer system 1000. In particular, the steps of the methods of FIGS. 4 and 6-9 are effected by instructions 1031 (see FIG. 10B) in the software 1033 that are carried out within the computer system 1000. The software instructions 1031 may be formed as one or more code modules, each for performing one or more particular tasks. The software may also be divided into two separate parts, in which a first part and the corresponding code modules performs the described calibration methods and a second part and the corresponding code modules manage a user interface between the first part and the user.

The software may be stored in a computer readable medium, including the storage devices described below, for example. The software is loaded into the computer system 1000 from the computer readable medium, and then executed by the computer system 1000. A computer readable medium having such software or computer program recorded on the computer readable medium is a computer program product. The use of the computer program product in the computer system 1000 preferably effects an advantageous apparatus for calibrating a projection system.

The software 1033 is typically stored in the HDD 1010 or the memory 1006. The software is loaded into the computer system 1000 from a computer readable medium, and executed by the computer system 1000. Thus, for example, the software 1033 may be stored on an optically readable disk storage medium (e.g., CD-ROM) 1025 that is read by the optical disk drive 1012. A computer readable medium having such software or computer program recorded on it is a computer program product. The use of the computer program product in the computer system 1000 preferably effects an apparatus for calibrating a projection system.

In some instances, the application programs 1033 may be supplied to the user encoded on one or more CD-ROMs 1025 and read via the corresponding drive 1012, or alternatively may be read by the user from the networks 1020 or 1022. Still further, the software can also be loaded into the computer system 1000 from other computer readable media. Computer readable storage media refers to any non-transitory tangible storage medium that provides recorded instructions and/or data to the computer system 1000 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and the corresponding code modules mentioned above may be executed to implement one or more graphical user interfaces (GUIs) to be rendered or otherwise represented upon the display 1014. Through manipulation of typically the keyboard 1002 and the mouse 1003, a user of the computer system 1000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1009, 1006), and a basic input-output systems software (BIOS) module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory 1034 (1009, 1006) to ensure that each process or application running on the computer module 1001 has sufficient memory in which to execute without colliding with memory allocated to another process. Furthermore, the different types of memory available in the system 1000 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the computer system 1000 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically includes a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1030, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1005 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1002, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The described arrangements use input variables 1054, which are stored in the memory 1034 in corresponding memory locations 1055, 1056, 1057. The described arrangements produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:

- a fetch operation, which fetches or reads an instruction 1031 from a memory location 1028, 1029, 1030;
- a decode operation in which the control unit 1039 determines which instruction has been fetched; and
- an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

Each step or sub-process in the processes of FIGS. 4 and 6-9 is associated with one or more segments of the program 1033 and is performed by the register section 1044, 1045, 1047, the ALU 1040, and the control unit 1039 in the processor 1005 working together to perform the fetch, decode, and execute cycles for every instruction in the instruction set for the noted segments of the program 1033.

The method of calibrating a projection system may alternatively be implemented in dedicated hardware such as one or more integrated circuits performing the functions or sub functions thereof. Such dedicated hardware may include graphic processors, digital signal processors, or one or more microprocessors and associated memories.

Figure 3:
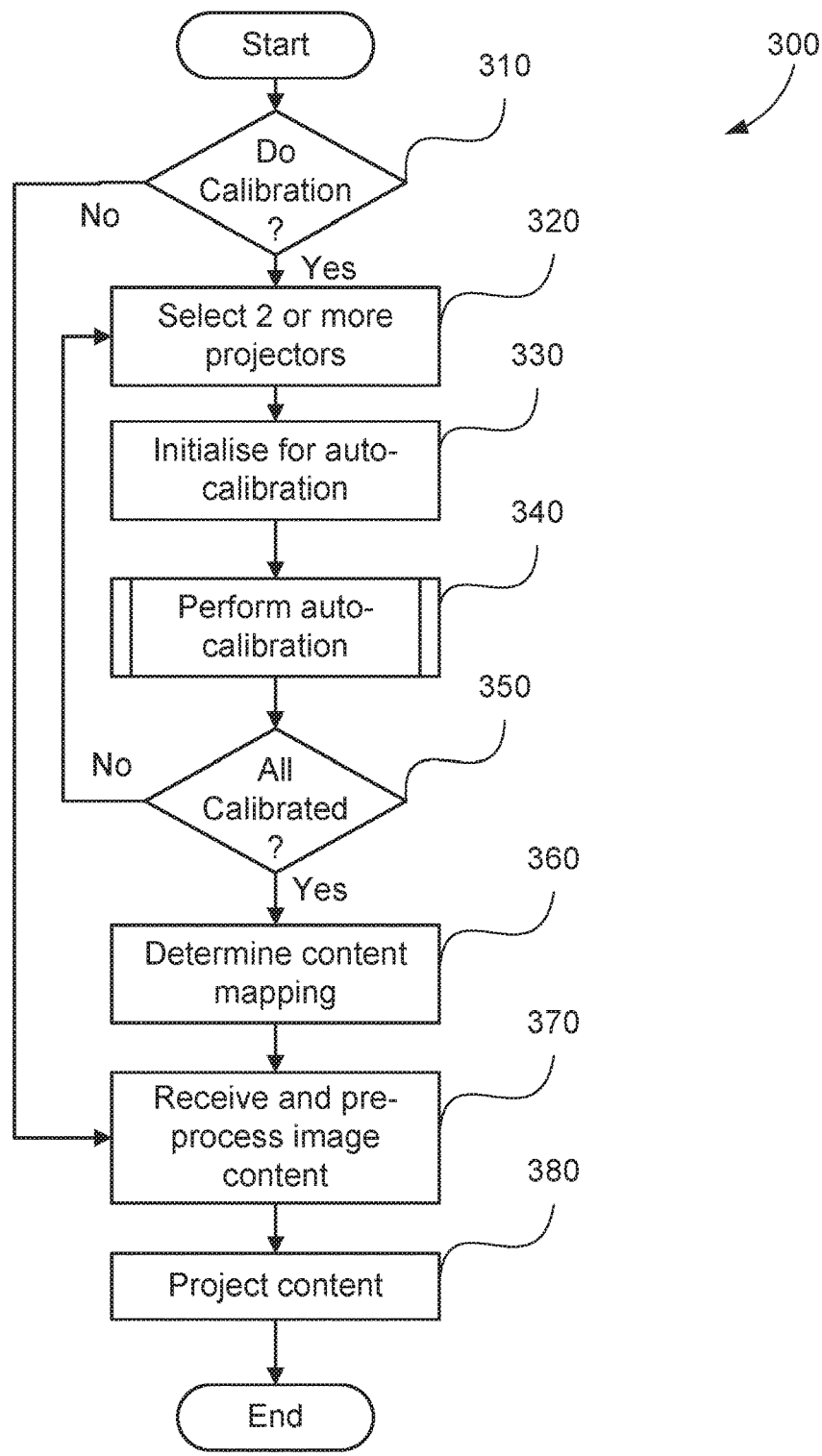
FIG. 3 is a schematic flow diagram of a method of displaying rectified content using a multi-projector arrangement.

The method executed by the projection controller 150 is now described with reference to FIG. 3. A computer-implemented method 300 of FIG. 3 is executed by the controller 150 for each image received. The method 300 is typically implemented as one or more modules of the application 1033, controlled under execution of the processor 1005, and stored in a memory such as the memory 1006.

The method 300 represents just those parts of the operation of the projection controller 150 required to illustrate the auto-calibration process of the arrangements described. In practice the projection controller 150 may carry out any number of additional functions such as the provision of web interface for controlling operation, additional processing of other inputs including but not limited to cameras, microphones, movement or position sensors and the like, and additional image processing operations such as resolution conversion, detail enhancement including colour processing and so on.

The method 300 is particularly useful in the case where a modification in device configuration is made to a single projector in a calibrated collection of projectors, for example to the projector 111 of the system 100. The method 300 can also be used in a number of bootstrap contexts, that is, when all projectors of system 100 are to be calibrated. The arrangements described can also be used to calibrate configuration of an image capture device in a system of multiple image capture devices.

The method 300 starts at a detecting step 310. Step 310 detects whether a calibration or recalibration is required for one or more projectors. A state requiring calibration detection may arise as a result of user input to the system 100 explicitly requesting re-calibration, direct or indirect modification of projector settings (such as zoom), or input from an auxiliary sensor such as a motion sensor. Alternatively, if an additional, uncalibrated projector is added to a previously calibrated system 100, then calibration of the additional projector is necessary. If calibration (including recalibration) is required then the method 300 proceeds to a selecting step. The projectors of the system 100 involved in the calibration are selected at step 320.

In one arrangement, a pair of (i.e. 2) projectors are selected at step 320. The projector pair is determined such that one of the projectors is the projector to be calibrated (or recalibrated) while the second is a projector for which calibration has been previously performed. Accordingly, the projector to be calibrated (or recalibrated) is brought into alignment with the calibrated projector.

In an alternative arrangement, two or more projectors could be selected at step 320, including a first projector that is to be calibrated and one or more projectors for which calibration has been previously performed, where the first projector is to be aligned with the remaining projectors selected at the step 320. The arrangement selecting two or more projectors would, for example, be useful when the projector to be calibrated has corresponding projection area that overlaps two or more other projection areas corresponding to the calibrated projectors.

In yet another arrangement, all projectors of the system 100 are selected at step 320, where all of the projectors require calibration. The arrangement selecting all projectors would, for example, be useful in bootstrap scenarios where all projectors of the system are previously uncalibrated and require calibration.

After selecting projectors involved in the calibration at step 320, the calibration method 300 proceeds to an initialisation step 330. Initialisation comprises establishing a connection with the camera 130 and initialising valid intrinsic parameter ranges (including focal length, and principal point X and Y components) for the uncalibrated projector (for example 111 and/or 112) and distortion parameters for the camera (130). Typically, the initialisation intrinsic parameters are drawn from a model database as the initialisation intrinsic parameters are specific to the projector or camera model and may further be constrained by projector or camera settings such as zoom that can be determined by a query of the device. The camera distortion parameters relate to the lens used in the camera 130 and provide a model for the barrel and/or pincushion distortion imparted by the lens of the camera. The camera distortion parameters may be used to determine a corrected camera image that is substantially free of lens distortions. Knowing the camera distortion parameters allows a rectilinear projection of the scene, effectively a projection in which the camera distortion errors are removed, to be calculated from the captured image. The rectilinear projection of the scene is in turn used in the auto-calibration processing. Functions for determining lens distortion parameters and compensating for lens distortion in captured images are known, such as the functions available in the OpenCV library.

After initialisation step 330, the method 300 continues to an auto-calibration step 340. The step 340 is performed to bring the uncalibrated projector into alignment with any calibrated projectors. A method 400 of performing auto-calibration, as implemented at the auto-calibration step 340 is described below in more detail with reference to FIG. 4.

The method 300 continues under execution of the processor 1005 from step 340 to a determining step 350. At 350, a test is performed to determine whether there are any projectors that still require calibration in the system 100. If an uncalibrated projector remains in the collection 100 ("No" at step 350) then steps 320 through 340 are repeated. Once all the projectors selected are calibrated ("Yes" at step 350), the method 300 continues to a determining step 360. A content mapping is determined at 360. Content mapping defines the regions from the input images that are to be displayed in each of the projected portions 115, 116, along with blending parameters (such as opacity) to be used in the overlap region (for example region 120 of FIG. 1). In one arrangement, the configuration of the projectors is specified to the projection controller 150 and the configuration information is used in the process of content mapping.

Having established the calibration and content mapping parameters, the method 300 continues to a receiving step 370. Image content rectification (regular frame processing) or warping to projection screen surface 145 is performed at step 370. Operation of the step 370 includes receiving and decoding the input image, followed by all cropping, interpolation and intensity gradation required to generate the rectified images content to be displayed/projected by each projector. The method 300 continues to project the images at execution of step 380 in each projector.

If at step 310, the application 1033 determines that calibration is not detected, the method 300 continues to step 370.

The auto-calibration step 340 of FIG. 3 is now described in detail with reference to the method 400 of FIG. 4. The method 400 is typically implemented as one or more modules of the application 1033, controlled under execution of the processor 1005, and stored in a memory such as the memory 1006.

Figure 4:
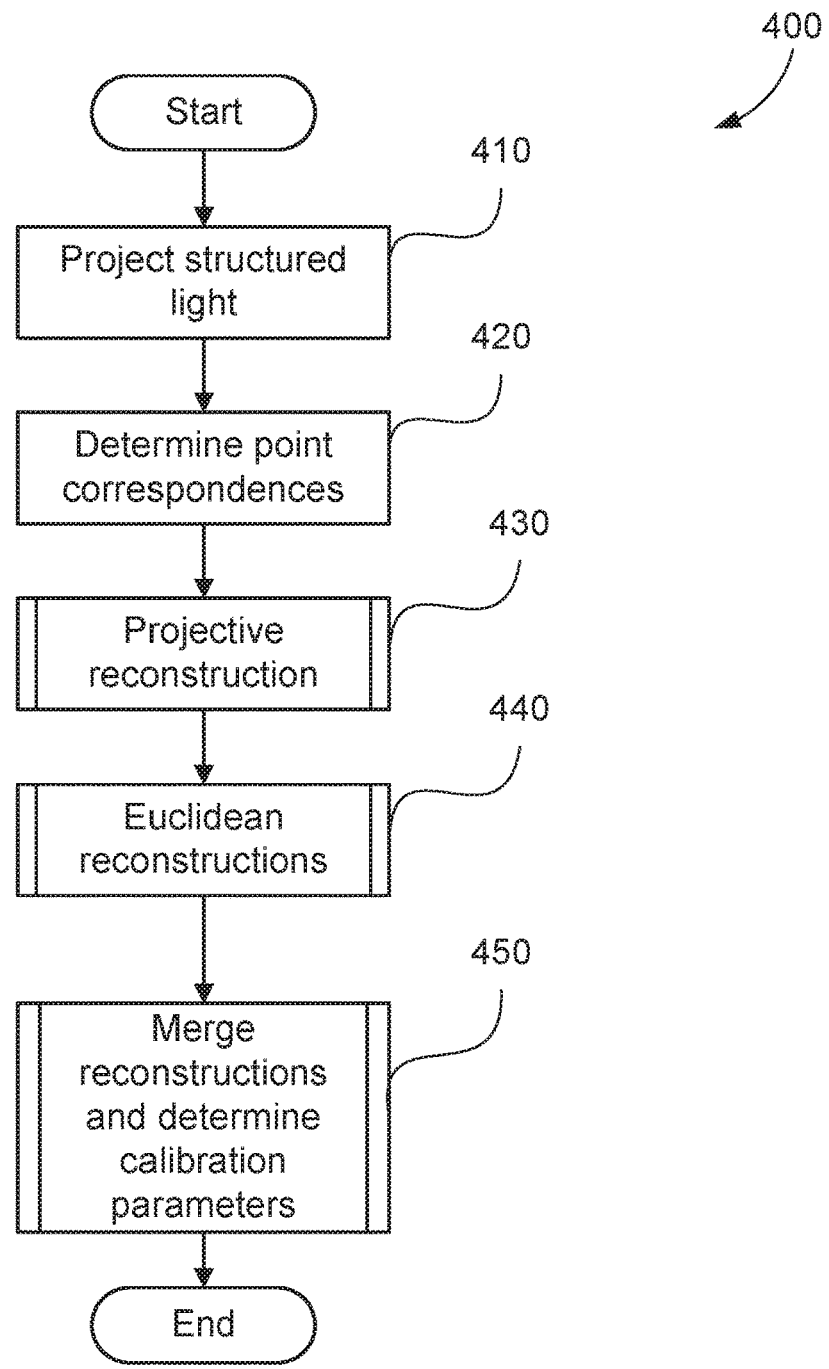
FIG. 4 is a schematic flow diagram of a method of performing automatic calibration and alignment of projective devices such as projectors and cameras having overlapping fields of view.
Figure 5A:
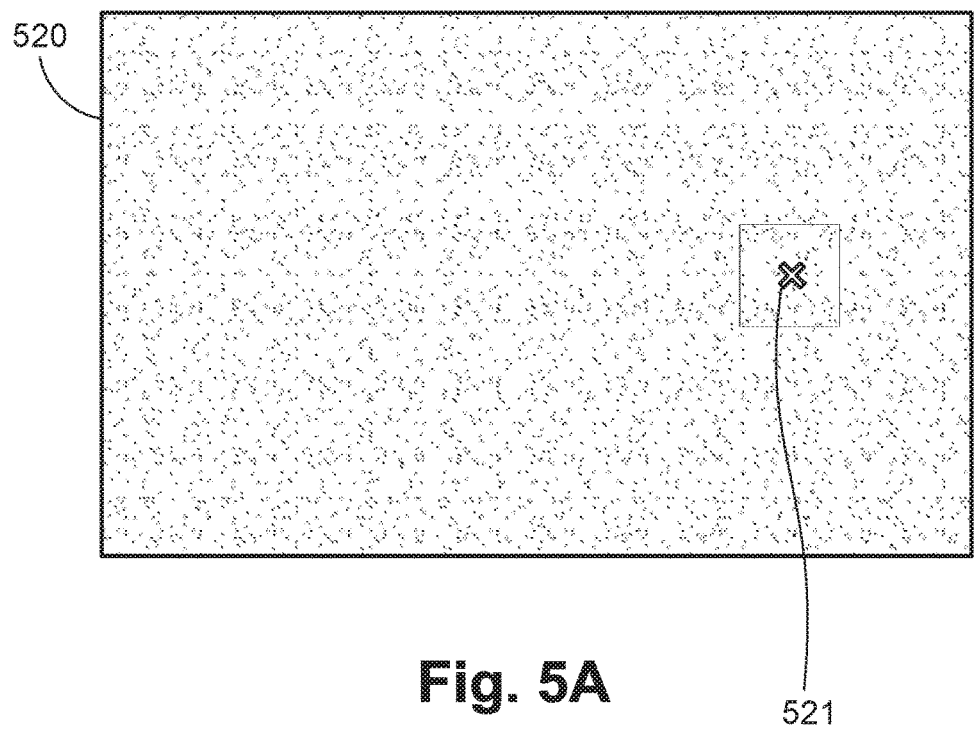
FIGS. 5A and 5B respectively depict a structured light pattern and a captured image of the same pattern projected by a projector.
Figure 5B:
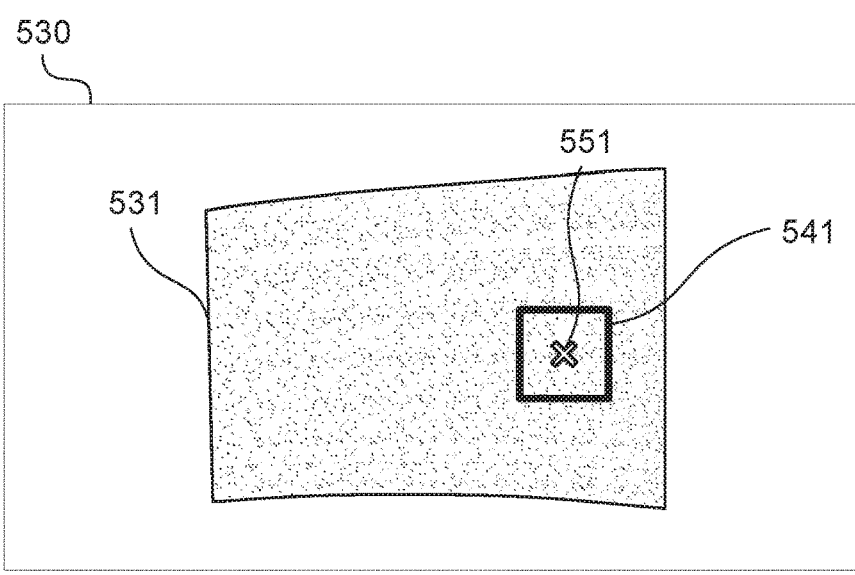

The auto-calibration method 400 of FIG. 4, commences with, and depends on the calculation of a set of point correspondences (that is, pairs of corresponding image points) between images projected by a projector (111 or 112) and captured by a camera (130). In one arrangement, the method 400 starts at a projecting step 410. Point correspondences are determined at step 410 by projecting a structured light pattern onto the surface 145. The projected structured light pattern may, for example, be a dot pattern 520 shown in FIG. 5A. A projected image 531 of a resultant projected pattern on the projection screen surface 145 is captured by the camera 130.

The method 400 continues from step 410 to a determining step 420. Camera distortion parameters may be used to determine a corrected camera image 530 that is substantially free of camera lens distortions. A region 541 from within the captured dot pattern 531 in the corrected camera image 530 can be matched (for example, using 2D correlation) with a corresponding position 521 in the projected structured light pattern 520 to determine a set of point correspondences at step 420. The determined point correspondences comprise coordinates 551 of each region in the corrected camera image 530 and each corresponding matched position 521 in the projected structured light pattern 520.

The method 400 continues from step 420 to a reconstruction step 430. The determined point correspondences are used to estimate a projective reconstruction at step 430. In the context of calibrating a camera-projector pair, the term "reconstruction" refers collectively to:
- a 3×4 projection matrix for the projector;
- a 3×4 projection matrix for the camera; and
- a set of structure points (3D points) obtained by triangulating camera-projector image correspondences using the 2 projection matrices.

Generally, a reconstruction may comprise more than 2 devices. In mathematical notation, a reconstruction can be written as:

$$\{P_i; X_j\}, i = 1 \ldots n, j = 1 \ldots m \qquad \text{Equation (1)}$$

In Equation (1) $P_i$ is a 3×4 projection matrix for the ith imaging device (e.g. corresponding to a camera or projector); $X_j$ is the jth reconstructed 3D point formed by triangulating image points using projection matrices $P_i$; and n is the number of imaging devices and m is the number of 3D points.

In the cases above, the projection matrix $P_i$ describing each imaging device (camera or projector) may be based on a pinhole model. The pinhole model consists of intrinsic parameters, distortion parameters and extrinsic parameters.

Intrinsic parameters of a pinhole model include:
  focal length parameters $f_x$ and $f_y$ in image pixels. Focal length parameters define the scaling between physical object size and image size. The focal length parameters $f_x$ and $f_y$ are different parameters from lens focal length expressed in millimeters.
  A principal point $(c_x, c_y)$ in image pixels corresponding to the point where the lens optical axis meets the image plane.

Distortion parameters of a pinhole model include:
  radial distortion parameters $k_1$ and $k_2$
  tangential distortion parameters $P_1$ and $p_2$ Extrinsic parameters of a pinhole model include a rotation matrix R (a 3×3 matrix). The rotation matrix R rotates world coordinate points to be relative to the pinhole device coordinate frame. Equivalently, the rotation matrix R rotates the device coordinate frame axes to be parallel with corresponding world coordinate frame axes. The term world coordinate frame refers to an arbitrarily chosen coordinate system that is common to all physical objects and devices of the system 100. The extrinsic parameters also include a translation vector t (a 3×1 column vector). The translation vector t of a pinhole device is the vector from the device to the origin expressed in the device coordinate frame.

A 3×3 intrinsic matrix K is defined as follows:

$$K = \begin{bmatrix} f_x & skew & c_x \\ 0 & f_y & c_y \\ 0 & 0 & 1 \end{bmatrix} \qquad \text{Equation (2)}$$

In Equation (2), skew is the called the skew term, and may usually be set to 0

Aspect ratio $\alpha$ is defined as follows:

$$\alpha = \frac{f_y}{f_x} \qquad \text{Equation (3)}$$

The aspect ratio $\alpha$ defines the ratio of image pixel width to image pixel height. Assuming that image pixels are perfectly square, aspect ratio $\alpha = 1.0$. In practice, aspect ratio may be slightly different from 1.0. For a given device, aspect ratio is usually considered to be a constant parameter (independent of focal length and principal point).

The 3×4 extrinsic matrix [R|t] transforms a homogeneous 3D world coordinate X into a 3D device relative coordinate X' as follows:

$$X' = [R|t]X \qquad \text{Equation (4)}$$

In Equation (4):
  X is a homogeneous 3D point (a 4×1 column vector) in world coordinates
  X' is a homogeneous 3D point (a 4×1 column vector) in device 3D coordinates The pinhole model equation transforms a 3D world coordinate point X to an image point x as follows:

$$x = K[R|t]X \qquad \text{Equation (5)}$$

In Equation (5):
  X is a homogeneous 3D point (a 4×1 column vector) in world coordinates
  x is a homogeneous 2D image point (a 3×1 column vector) in device image plane coordinates A 3×4 projection matrix P may be defined from intrinsic and extrinsic parameters as follows:

$$P = K[R|t] \qquad \text{Equation (6)}$$

such that:

$$x = PX \qquad \text{Equation (7)}$$

Within the context of the arrangements described, a pinhole model is used to describe each of camera 130 and the projectors 111 and 112 of the system 100. The camera 130 comprises an optical lens system, an aperture and a camera image sensor comprising a grid of camera image pixels. A pinhole model including a calibrated set of pinhole model parameter values allows accurate modelling of rays of light collected by the camera lens, and cast on to the camera image sensor via the camera aperture. Each projector 111 and 112 contains a lamp, a projector panel image comprising a grid of projector image pixels, and a projection lens allowing the projection of imagery of the panel image on to the projection screen surface 145. Although the direction of light is opposite that of the camera 130, a pinhole model and calibrated pinhole model parameter values allows accurate modelling of the light rays emitted by the projector 111 or 112 and cast on to the projection screen surface 145. Accordingly, the projective reconstruction is determined using corresponding points between pixels in an image captured by the camera and pixels in the calibration pattern projected by the projector 111 for example.

A projective reconstruction is a reconstruction whereby reconstructed 3D points $X_j$ are different from the true scene points on the projection surface 145. Instead of reconstructing the original true scene, the reconstructed 3D points are within a projective transform (a 4×4 homogeneous matrix) of the true scene. A 4×4 projective transform has 15 degrees of freedom, since a homogeneous matrix is defined up to a scale. Hence, a projective reconstruction has a 15 parameter ambiguity with respect to the true scene.

The method 400 continues from step 430 to a reconstruction step 440. The projective reconstruction determined at step 430 is upgraded to be a Euclidean reconstruction at step 440. To upgrade the projective reconstruction to be a Euclidean reconstruction, 8 parameters of the total 15 parameter ambiguity must be resolved. The method 400 resolves the ambiguities using a two-step approach where first a set of candidate solutions (also referred to as a line or family of solutions) for a Euclidean reconstruction are determined at step 440. The method 400 continues from step 440 to a merging step 450. The set of candidate solutions determined at step 440 is used as a constraint to determine a single best estimate of the Euclidean reconstruction for the target projector at step 450.

A Euclidean reconstruction (also referred to as a metric reconstruction), as implemented at step 440, is within a similarity transform of the true scene. In other words, the Euclidean reconstruction is within a rotation, translation and a scale of the true scene. A similarity transform has 7 degrees of freedom (3 for translation, 3 for rotation and 1 for scale). That is, a Euclidean reconstruction is usually determined relative to some chosen coordinate frame (e.g. the camera's coordinate frame located at the camera origin), and not relative to the world coordinate frame of the true scene. A Euclidean reconstruction is also determined "up-to a scale" (i.e. within some scale factor of the true scene), and hence may not be in world coordinate frame units (e.g. meters). Accordingly, there are 7 parameters of ambiguity of a Euclidean reconstruction. Specifically, unless additional information is available, the ambiguities of a Euclidean reconstruction are as follows:

- a 3 parameter translation ambiguity to position the reconstruction at the world coordinate frame origin position;
- a 3 parameter rotation ambiguity to rotate (orient) the reconstruction to be aligned with the world coordinate frame; and
- a 1 parameter scale ambiguity to scale the reconstruction to world coordinate frame units (e.g. meters).

Given a Euclidean reconstruction formed from corresponding image points of a camera and a projector, if the distance between camera and projector (referred to as the baseline distance) is known, the 1 parameter scale ambiguity of the reconstruction can be resolved. Alternatively, if either the physical size of an object in the scene was known (e.g. the size of a printed calibration chart), or if the physical distance to the surface (145) from the camera (130) was known, that too would allow the scale ambiguity to be resolved.

A Euclidean reconstruction comprises 3D points that are within a similarity transform (i.e. a scale, rotation and translation) of the true scene within the world coordinate frame. A Euclidean reconstruction, as implemented at step 440, may be defined as follows:

$$\{P_iH;Y_j\}, \text{for } i=1\ldots n, j=1\ldots m \quad \text{Equation (8)}$$

or:

$$\{P_iH;H^{-1}H_j\}, \text{for } i=1\ldots n, j=1\ldots m \quad \text{Equation (9)}$$

In Equations (8) and (9):

$P_i$ is defined as a 3×4 projection matrix for the $i^{th}$ imaging device (e.g. corresponding to a camera or projector)

$X_1$ is defined as the $j^{th}$ reconstructed 3D point formed by triangulating corresponding image points using projection matrices $P_i$ H is a 4×4 projective transformation matrix (referred to as the upgrade matrix) that "upgrades" the projective reconstruction to a Euclidean reconstruction.

$Y_j$ is a reconstructed point that is within a similarity transform of the true scene (i.e. within a scale/translation/rotation).

A Euclidean reconstruction is a member of the set of all possible projective reconstructions.

In summary:

1. a projective projection matrix $P_{projective}$ may be upgraded to be a Euclidean projection matrix as follows:

$$P_{Euclidean}=P_{projective}H \quad \text{Equation (10)}$$

2. a projective 3D structure point $X_{projective}$ may be upgraded to be a Euclidean 3D structure point as follows:

$$X_{Euclidean}=H^{-1}X_{projective} \quad \text{Equation (11)}$$

If the camera intrinsic parameters are assumed known (at least approximately), then the known parameters provide 5 constraints (i.e. camera fx, fy, cx, cy and skew are each known).

For the projector, 2 additional constraints are assumed known (e.g. projector $f_y=\alpha f_x$, and skew=0.0).

The (partial) knowledge of camera and projector intrinsic parameters gives 7 (=5+2) of the required 8 constraints. Having only 7 constraints means a 1 parameter family or set of candidate solutions exists. At least 1 more constraint is required to determine the required solution.

The step 440 therefore executes to determine a set of candidate solutions that reside on a line in the solution space, as described below.

An equation for the projector's epipolar point $e_{prj}$ (a 3×1 homogeneous vector) is as follows:

$$e_{prj}=K_{prj}[R_{prj}|t_{prj}]C_{cam} \quad \text{Equation (12)}$$

If the projector (111 or 112) is (temporarily, for the purposes of the following derivation) considered the reference device (i.e. the projector has no rotation and no translation with respect to the world coordinate frame) then:

$$e_{prj} = K_{prj}[I\,|\,0]C_{cam} \quad \text{Equation (13)}$$

$$e_{prj} = K_{prj}\begin{bmatrix} C_{cam_x} \\ C_{cam_y} \\ C_{cam_z} \end{bmatrix} \quad \text{Equation (14)}$$

In Equations (13) and (14) $C_{cam}=[C_{cam_x}\,C_{cam_y}\,C_{cam_z}\,1]^T$ is the position of the camera relative to the projector's 3D coordinate frame.

By expanding Equation (14), a linear relationship between a projector's principal point $(c_x,c_y)$ and focal length parameters $(f_x,f_y)$ is established:

$$\begin{bmatrix} e_{prj\_x} \\ e_{prj\_y} \\ 1 \end{bmatrix} \cong \begin{bmatrix} f_x & 0 & c_x \\ 0 & f_y & c_y \\ 0 & 0 & 1 \end{bmatrix}_{prj} \begin{bmatrix} C_{cam_x} \\ C_{cam_y} \\ C_{cam_z} \end{bmatrix} \quad \text{Equation (15)}$$

$$\begin{bmatrix} e_{prj\_x} \\ e_{prj\_y} \\ 1 \end{bmatrix} = \begin{bmatrix} C_{cam_x}\cdot f_x + C_{cam_z}\cdot c_x \\ C_{cam_y}\cdot f_y + C_{cam_z}\cdot c_y \\ C_{cam_z} \end{bmatrix} \quad \text{Equation (16)}$$

In Equations (15) and (16):

≅ indicates equality up-to a scale $$e_{prj} = \begin{bmatrix} e_{prj\_x} \\ e_{prj\_y} \\ 1 \end{bmatrix},$$

$$K_{prj} = \begin{bmatrix} f_x & 0 & c_x \\ 0 & f_y & c_y \\ 0 & 0 & 1 \end{bmatrix}_{prj}$$

$$C_{cam} = \begin{bmatrix} C_{cam_x} \\ C_{cam_y} \\ C_{cam_z} \\ 1 \end{bmatrix}$$

is the camera's centre-of-projection in the projector's 3D coordinate frame.

Expanding and rearranging terms in Equation (16) gives the linear relationships:

$$c_x = -\frac{C_{cam_x}}{C_{cam_z}} f_x + e_{prj\_x} \quad \text{Equation (17)}$$

$$c_y = -\frac{C_{cam_y}}{C_{cam_z}} f_y + e_{prj\_y}$$

The relationships of Equation (17) define a line. That is, for a camera-projector pair with a fixed relative pose between the devices, and a fixed estimate of the projector epipolar point $e_{prj}$ there is a line of solutions, also referred to as a set of solutions, that satisfy the constraints of Equation (17).

The constraints of Equation (17) can be rearranged in various ways to express $c_x$ in terms of $f_x$ or $f_x$ in terms of $c_x$. In summary, the constraints can be expressed as linear relationships between principal point ($c_x, c_y$) and focal length parameters ($f_x, f_y$). The linear relationships, used in the subsequent description of the algorithm, are:

$$c_x = -\frac{c_{cam_x}}{c_{cam_z}} f_x + e_{prj\_x} \quad \text{Equation (18)}$$

$$c_y = -\frac{c_{cam_x}}{c_{cam_z}} f_y + e_{prj\_y} \quad \text{Equation (19)}$$

$$f_x = \frac{c_{cam_z}}{c_{cam_x}} (e_{prj\_x} - c_x) \quad \text{Equation (20)}$$

$$f_y = \frac{c_{cam_z}}{c_{cam_y}} (e_{prj\_y} - c_y) \quad \text{Equation (21)}$$

In Equations (18) to (21), $C_{cam}$ is the position of the camera relative to the projector's 3D coordinate frame In the arrangements described, an assumption is made that the skew term of the projector's intrinsic matrix is 0.0. The skew term of an intrinsic matrix K is located at row 1, column 2 as follows:

$$K = \begin{bmatrix} f_x & \text{skew} & c_x \\ 0 & f_y & c_y \\ 0 & 0 & 1 \end{bmatrix} \quad \text{(Equation (2))}$$

The term aspect ratio (denoted by symbol a) refers to the ratio of focal length $f_y$ to focal length $f_x$. That is:

$$\alpha = \frac{f_y}{f_x} \quad \text{(Equation (3))}$$

The aspect ratio describes the ratio of a pixel's height to a pixel's width. That is, a camera sensor (or projector panel image) with perfectly square pixels, will have aspect ratio $\alpha=1.0$. In one arrangement, the aspect ratios of camera and projectors are known or may be assumed to have the value $\alpha=1.0$.

With the assumption that aspect ratio $\alpha$ is known, the parameter space (i.e. the set of parameters that the application 1033 is trying to determine) is simplified to the set of parameters $\{f, c_x, c_y\}$, where:

$$f_x = f \quad \text{Equation (22)}$$

$$f_y = \alpha f \quad \text{Equation (23)}$$

In Equation (23), $\alpha$ is the known, constant aspect ratio $$\frac{f_y}{f_x}$$

corresponding to the height to width ratio of a pixel.

The projector's (for example projector 111) epipolar point $e_{prj}$ is the position where the line of solutions meets the f=0 plane. The direction of the line of solutions within the parameter space is determined by the extrinsic relationship between the camera and projector.

Specifically, a vector defining the line's direction is:

$$LineDir = \left(1, -\frac{C_{cam_x}}{C_{cam_z}}, -\frac{C_{cam_y}}{C_{cam_z}}\right) \quad \text{Equation (24)}$$

$$= \left(1, -\frac{t_{prj_x}}{t_{prj_z}}, -\frac{t_{prj_y}}{t_{prj_z}}\right)$$

In Equation (24), $t_{prj}$ is the right-most column of the projector's 3×4 extrinsic matrix $[R_{prj}|t_{prj}]$ assuming the camera is located at the origin.

Alternatively, Equation (24) can be expressed in terms of angles (azimuth and inclination angles $\theta_x$ and $\theta_y$) as follows:

$$LineDir = (1, -\tan\theta_x, -\tan\theta_y) \quad \text{Equation (25)}$$

In Equation (25):

$\theta_x$ is the azimuth angle from the projector's 3D frame to the camera's position. Note $$\text{that } \tan\theta_x = \frac{t_{prj_x}}{t_{prj_z}} \quad \text{Equation (26)}$$

$\theta_y$ is the inclination angle from the projector's 3D frame to the camera's position. Note $$\text{that } \tan\theta_y = \frac{t_{prj_y}}{t_{prj_z}} \qquad \text{Equation (27)}$$

Having established a set of candidate Euclidean reconstructions at step 440, the method 400 continues to merging step 450. A merging method is used at step 450 to determine a single solution that best aligns the reconstruction for the projector being calibrated with at least one other device within the collection of projective devices. The inputs to the Euclidean merge step 450 are a reference reconstruction and one or more non-reference reconstructions.

The reference reconstruction relates to a Euclidean reconstruction of an existing calibrated device (that produces a seamless projection on the projection screen surface) to which other reconstructions are to be aligned. In one arrangement, the reference reconstruction is a reconstruction that is formed by the camera 130 and a projector (such as 111 or 112) that have both been previously calibrated.

3. The one or more non-reference reconstructions relate to one or more projective reconstructions. In the arrangements described a set of candidate solutions has already been determined (at step 440 of the method 400) for each non-reference reconstruction.

The merging step 450 determines a focal length value $f_{prj}$ for the projector of each non-reference reconstruction. The determined focal length value $f_{prj}$ along with line of solutions information, determines a solution of intrinsic parameters f,cx,cy. The determined intrinsic parameters are used to produce a reconstruction that best aligns with the reference reconstruction. Accordingly, non-reference reconstructions are merged starting with non-reference reconstructions that share an overlap region with the reference reconstruction. Remaining non-reference reconstructions may be merged with other non-reference reconstructions that have already been merged. Thus, calibration can be propagated from a first device to a second and onto a third and so on. Alternatively, once a second reconstruction has been aligned to a first reconstruction, the pair of reconstructions may be swapped and the method applied a second time. Accordingly, any pair of reconstructions can be iteratively refined. Other optimisation methods known in the art, such as bundle adjustment, can be used to refine a set of reconstructions and, hence, determine device calibration parameters.

An important concept related to the arrangements described is the concept of reprojection error. Reprojection error is a measure of geometric distance error evaluated in one or more image planes and measured in pixels. For example, reprojection error may be evaluated using corresponding points from the camera sensor plane of the camera 130 and/or each of the projector panel image planes of the projectors 111 and 112.

Given a set of 3D structure points $X_j$, a projection matrix P and a set of image points $x_j$ corresponding to the 3D points $X_j$, reprojection error is evaluated in the image plane as follows:

$$err = \sqrt{\frac{\sum_{j=1}^{N} d(\hat{x}_j, x_j)^2}{N}} \qquad \text{Equation (28)}$$

In Equation (28):
$\hat{x}_j$ is the predicted 2D image point (a homogeneous 3×1 vector) corresponding to $X_j$ according to projection matrix P as follows:

$$\hat{x}_j \approx PX_j \qquad \text{Equation (29)}$$

$x_j$ is an observed (measured) 2D image point corresponding to 3D structure point $X_j$;
$d(\hat{x}_j, x_j)$ is the magnitude of the distance error between predicted and observed image points measured in the image plane in image pixels;
M is the total number of 3D structure points $X_1$; and
err is the root mean square (RMS) reprojection error The reprojection error may be evaluated in a single image plane or in multiple image planes. The reprojection error is typically determined as the total root mean square (RMS) error value evaluated in the 1 or more image planes as shown in Equation (28). Alternatively, reprojection error maybe determined as a sum of squared residuals.

Using the measurement of reprojection error, the accuracy of a reconstruction, either a projective or Euclidean reconstruction may be evaluated. For example, given 2 candidate reconstructions, evaluating reprojection error allows comparison of the 2 candidate reconstructions in order to determine which candidate reconstruction is a most accurate and most plausible reconstruction of the two.

In the arrangements described, given a reconstruction, intra-reconstruction reprojection error refers to reprojection error evaluated in the image planes of the devices used to form the reconstruction. For example, if a reconstruction is formed by triangulating corresponding image points from the camera 130 and the projector 111, the intra-reconstruction reprojection error is determined by evaluating the RMS (root mean square) reprojection error in the image planes of both the camera 130 and the projector 111.

The arrangements described also relate to inter-reconstruction reprojection error. Given a reconstruction A (formed by the camera 130 and the projector 111) and reconstruction B (formed by the camera 130 and the projector 112), inter-reconstruction reprojection error involves determining a RMS reprojection error value by:
  projecting 3D points of reconstruction A into the image planes of reconstruction B, and,
  projecting 3D points of reconstruction B into the image planes of reconstruction A.

The steps of estimating a projective reconstruction (430), determining a set of candidate reconstructions (440) and determining the specific calibration parameters for a device (450) are now described in detail with reference to FIGS. 6-9 respectively.

A method 600 of estimating a projective reconstruction, as implemented at step 430 of FIG. 4 is described in detail with reference to FIG. 6. The method 600 is typically implemented as one or more modules of the application 1033, controlled under execution of the processor 1005, and stored in a memory such as the memory 1006.

The method 600 starts at a fitting step 610. Execution of step 610 first estimates a fundamental matrix F based on the set of corresponding points determined at step 420. The fundamental matrix F is a 3×3 matrix that maps points in a first image to lines in a second image, where the first and second images are images of the same scene, having overlapping fields of view. The degree of overlap has an effect on the outcome of the fundamental matrix. Typically, the amount of overlap is relatively substantial between the first and second images. In some implementations the field of view of one device is enclosed within the field of view of another device (for example the projection of one projector can be completely included in an image captured by a camera). The fundamental matrix F, is determined from sets of corresponding image points across a pair of images using commonly available image processing toolkits such as OpenCV. Known calculation methods, including the least median squares technique and the random sample consensus (RANSAC) technique, are robust to outliers in the set of corresponding points and are able to return a "mask", referred to as an inlier mask, which identifies the points that are most accurate according to the determined fundamental matrix.

The method 600 continues from step 610 to an adjustment step 620. Due to noise in image points or other sources of error, a fundamental matrix F fitted to image points will typically contain some significant inaccuracy. In particular, while the reprojection error associated with the fundamental matrix F may be low (e.g. evaluated using a set of inlier image correspondences), the encoded intrinsic parameter information within F may be inaccurate. Accordingly, known constraints on the device intrinsic parameters $K_{cam}$ and $K_{prj}$ are imposed at step 620 to adjust the fundamental matrix. Step 620 is implemented as follows.

Firstly, the application 1033 converts the fundamental matrix F to an essential matrix E using knowledge of camera and projector intrinsic parameters, using Equation (30):

$$E = K_{prj}^T \cdot F \cdot K_{cam} \qquad \text{Equation (30)}$$

In execution of step 620 the application 1033 proceeds to enforce singular value constraints on E. Every essential matrix has two equal non-zero singular values and one zero singular value (thus the rank of an essential matrix is 2).

The application 1033 proceeds to convert the essential matrix E back to a fundamental matrix F using Equation (31):

$$F = K_{prj}^{-T} \cdot E \cdot K_{cam}^{-1} \qquad \text{Equation (31)}$$

In one arrangement, the exact intrinsic matrices of the camera $K_{cam}$ and the projector $K_{prj}$ are not known and only the following information is available:

Camera intrinsic matrix $K_{cam}$ is approximately known (an approximate estimate is available). The camera intrinsic matrix will depend on the properties of the camera being used. In some implementations, the camera intrinsic matrix information may be available in a specification associated with the camera, for example for a prime lens may have a fixed focal length. In other implementations, the camera intrinsic matrix information may be output by the camera upon receiving an instruction from a user.

Projector intrinsic parameter ranges:
Focal length parameter range $[f_{min}, f_{max}]$
Principal point parameter ranges:
$[cx_{min}, cx_{max}]$
$[cy_{min}, cy_{max}]$ Using the known (approximate) $K_{cam}$ and projector intrinsic parameter ranges, the estimated fundamental matrix F is adjusted at step 620 as follows:

1. A hypothetical projector intrinsic matrix $K'_{prj}$ is sampled from known intrinsic parameter ranges $[f_{min}, f_{max}]$, $[cx_{min}, cx_{max}]$ and $[cy_{min}, cy_{max}]$. The intrinsic matrix $K'_{prj}$ can be determined or sampled by trial and error and based on prior information such as parameter ranges.
2. An essential matrix E is determined from the initial fundamental matrix F as follows:

$$E = K_{prj}^T \cdot F \cdot K_{cam} \qquad \text{Equation (32)}$$

3. The essential matrix E is decomposed using singular value decomposition (SVD) as follows:

$$E = SVD(E) = USV^T \qquad \text{Equation (33)}$$

4. A cost value is determined from the singular values (diagonal entries of S) as follows:

$$\text{cost} = 1.0 - \frac{S(2,2)}{S(1,1)} \qquad \text{Equation (34)}$$

where S(row,col) row≥1 and col≥1. If the singular values are nearly equal, the cost is relatively close to zero.

5. Steps 1-4 are repeated a number times, each time using a different set of projector intrinsic parameters by choosing intrinsic parameters from known intrinsic parameter ranges $[f_{min}, f_{max}]$, $[cx_{min}, cx_{max}]$ and $[cy_{min}, cy_{max}]$ to determine an essential matrix E having lowest cost.

6. The adjusted fundamental matrix is determined from the lowest cost essential matrix E (and corresponding $K_{prj}$, U and V matrices) as follows:

$$F = K_{prj}^{-T} \cdot E \cdot K_{cam}^{-1} \qquad \text{Equation (35)}$$
$$= K_{prj}^{-T} \cdot U \cdot \text{diag}(1,1,0) \cdot V^T \cdot K_{cam}^T$$

where diag(a,b,c) is the 3×3 diagonal matrix with values a,b,c along the diagonal and zeros elsewhere.

In one arrangement, at step 620, the Levenberg-Marquardt (LM) algorithm is used to efficiently adjust the fundamental matrix F using the essential matrix technique described above. The Levenberg-Marquardt algorithm can quickly determine an optimised solution to the 3 projector intrinsic parameters f, cx and cy that produce an essential matrix E of lowest cost. The optimisation process is initialised with values of f, cx and cy that are at the centre of the expected ranges:

$$f = \frac{f_{min} + f_{max}}{2} \qquad \text{Equation (36)}$$

$$cx = \frac{cx_{min} + cx_{max}}{2} \qquad \text{Equation (37)}$$

$$cy = \frac{cy_{min} + cy_{max}}{2} \qquad \text{Equation (38)}$$

After performing matrix adjustment for the fundamental matrix at step 620, the method 600 continues to an optimising step 630.

At step 630, the fundamental matrix is optimised to simultaneously minimise reprojection error and cost terms that enforce an F matrix that is consistent with a plausible set of intrinsic parameters. The 7 degrees of freedom of F can be parameterised as follows:

$$F(a,b,c,d,e,f,\theta) = R_{U1}(a) \cdot R_{U2}(b) \cdot R_{U3}(c) \cdot U \cdot \qquad \text{Equation (39)}$$
$$\begin{bmatrix} \cos\theta & 0 & 0 \\ 0 & \sin\theta & 0 \\ 0 & 0 & 0 \end{bmatrix} \cdot (R_{V1}(d) \cdot R_{V2}(e) \cdot R_{V3}(f) \cdot V)^T$$

In Equation (39) $R_{Un}(p)$ defines a 3×3 rotation matrix rotating by angle p (in radians) about the axis defined by column n of matrix U. Parameters a-f are rotation angles in radians.

In one arrangement, only the epipolar points (4 of 7 degrees of freedom) of F are optimised, and a simplified parameterisation of F is used as per Equation (40).

$$F(a,b,d,e) = R_{U1}(a) \cdot R_{U2}(b) \cdot U \cdot S \cdot (R_{V1}(d) \cdot R_{V2}(e) \cdot V)^T \quad \text{Equation (40)}$$

A Levenberg-Marquardt (LM) optimisation is used to optimise the 4 parameters a, b (rotation angle parameters manipulating the epipolar point of image 1), d and e (rotation angle parameters manipulating the epipolar point of image 2). Since the projector's principal point cx, cy is not known, it is also necessary to optimise the cx and cy parameters. Prior to LM optimisation, cx and cy parameters are initialised to the values that produced the lowest cost solution during matrix adjustment of F at step 620. The rotation angles a, b, d and e are initialised to zero. The cost function used for optimisation evaluates both reprojection error and constrains the intrinsic parameters f, cx and cy to known values (for camera) and ranges (for projector). To constrain the focal length parameter f, the cost function evaluates the following expression:

$$f^2 = -\frac{(p_1^T [e_1]_\times I_{110} F^T p_2)(p_1^T F^T p_2)}{p_1^T ([e_1]_\times I_{110} F^T I_{110} F) p_1} \quad \text{Equation (41)}$$

In Equation (41):
$f^2$ is the focal length squared of the projector, and may be negative
F is the current estimate of the fundamental matrix
$P_1$ is an estimate of the principal point of the camera image (a homogeneous 3×1 vector)
$p_2$ is an estimate of the principal point of the projector image (a homogeneous 3×1 vector)
$e_1 = [e1\ e2\ e3]^T$ is the epipolar point of image 1 (a homogeneous 3×1 vector)
$I_{110}$ is the following 3×3 matrix:

$$\begin{bmatrix} 1 & 0 & 0 \\ 0 & 1 & 0 \\ 0 & 0 & 0 \end{bmatrix}$$

$[e_1]_x$ is a 3×3 skew-symmetric cross product matrix, as shown below:

$$\begin{bmatrix} 0 & -e3 & e2 \\ e3 & 0 & -e1 \\ -e2 & e1 & 0 \end{bmatrix}$$

In Equation (40), the value $f^2$ may be negative. A negative value indicates that the estimate of the fundamental matrix is poor, and hence a high cost value should be returned by the LM cost function. If $f^2 < 0$, then an additional, large, penalty value is added to the final cost value returned by the LM cost function. If $f^2 > 0$, then f is determined as $f = \sqrt{f^2}$ and a cost term is calculated based on the proximity off to predetermined focal length range information as retrieved at step 330 as described above with reference to FIG. 3. Similarly, cost terms are calculated based on the proximity of cx and cy to predetermined range values determined at step 330. Finally, the LM cost function calculates the final cost value as the sum of reprojection error and additional cost terms determined from intrinsic parameter estimates (f,cx,cy).

At step 630, after the iterative LM process completes, an optimised (i.e. lowest cost) F matrix and intrinsic parameter estimates f,cx,cy are determined. Alternatively, other known techniques to improve accuracy of F may be used, such as projective bundle adjustment. A projective bundle adjustment may be implemented by initialising projective projection matrices using an initial estimate of the fundamental matrix, triangulating a set of projective 3D points and then non-linearly optimising both the projective projection matrices and the projective 3D points so as to minimise residual reprojection error in the image planes. An improved estimate of the fundamental matrix F may then be determined from the optimised projective projection matrices after completion of the projective bundle adjustment.

Having optimised the fundamental matrix F, the method 600 continues to a determining step 640. The epipolar points $e_{cam}$ and $e_{prj}$ are determined as right null vectors of F and $F^T$ at execution of step 640.

The method 600 continues form step 640 to an initialising step 650. At step 650, separate projective matrices $P_{projective}$ for each of the associated devices (for example projectors 111 and 112) are initialised. Projective matrices are initialised in canonical camera form, where the projection matrix of the first device (the camera 130) is the 3×4 matrix [I|0]. Since the camera's (not the projector's) projection matrix is initialised to [I|0], throughout most of the remainder of the algorithm the camera 130 is considered the reference device and hence the camera's coordinate frame is the reference coordinate frame (that is, the origin position will be at the camera centre of projection).

At step 650, using the fundamental matrix F obtained upon execution of step 630 and projector epipolar point $e_{prj}$, projective projection matrices are initialised as follows:

$$P^P_{cam} = [I\ |\ 0] = \begin{bmatrix} 1 & 0 & 0 & 0 \\ 0 & 1 & 0 & 0 \\ 0 & 0 & 1 & 0 \end{bmatrix} \quad \text{Equation (42)}$$

$$P^P_{prj} = [[e_{prj}]_\times F\ |\ e_{prj}] \quad \text{Equation (43)}$$

In Equation (43), F is the fundamental matrix, $e_{prj} = [e1\ e2\ e3]^T$ is the epipolar point in homogeneous 3×1 column vector form and
$[e_{prj}]_x$ is the following 3×3 skew-symmetric matrix:

$$\begin{bmatrix} 0 & -e3 & e2 \\ e3 & 0 & -e1 \\ -e2 & e1 & 0 \end{bmatrix}$$

The method 600 continues from step 650 to a triangulation step 660. Given projection matrices for the camera 130 and the projector (111), and a set of corresponding camera-projector image points, a set of 3D structure points are determined by triangulation at execution of step 660. The 3D structure points belong to a projective reconstruction (i.e. they are only correct up-to-a projective transform of the true Euclidean scene). Projective reconstruction of 3D points requires a triangulation technique that is invariant to projective transformation. Suitable triangulation functions are implemented in widely available computer vision libraries including OpenCV.

The method 600 continues from step 660 to an adjusting step 670. At step 670, the projective reconstruction is adjusted to ensure that the cheirality (i.e. sign) of points and projection matrices is consistent. Step 670 executes to check the cheirality and adjust the cheirality if necessary to ensure that all reconstructed points are in front of both the camera 130 and the projector (111). The relationship between a projective 3D point X (a 4×1 column vector), projection matrix P, and corresponding image point x is as follows:

$$\frac{1}{w} \cdot x = P \cdot X \qquad \text{Equation (44)}$$

In Equation (43) the term 1/w applies the homogeneous divide, w being the bottom row of the right-hand side expression. Given the relationship of Equation (44), the step 670 adjusts the projective reconstruction to ensure that w is positive for all projective 3D points X and projection matrices P, as follows:

1. For $P=P_{cam}$ (i.e. the reference device) ensure w is positive for all projective 3D points X by negating X as required. Ensuring w is positive is possible, since projective 3D point X is a homogeneous vector, and scaling X by any non-zero number (including −1) means that X will represent the same projective 3D point.
2. For $P=P_{prj}$ (i.e. the non-reference device) ensure that w is positive for all projective 3D points X by negating $P_{prj}$ if required. Ensuring w is positive is possible, since negating the projection matrix P will simply cause the homogeneous image point x to be scaled by −1, which means that x will still represent the same image point since x is a homogeneous entity.

The method 600 continues to a determining step 680. Step 680 determined if more projectors are in the system 100. If so ("Yes" at step 680), the steps 610-670 are repeated for each device in the collection 100. When the application 1033 determines at step 680 that all devices in the collection 100 have been processed by the method 600 ("No" at step 680), the method 600 ends.

Figure 6:
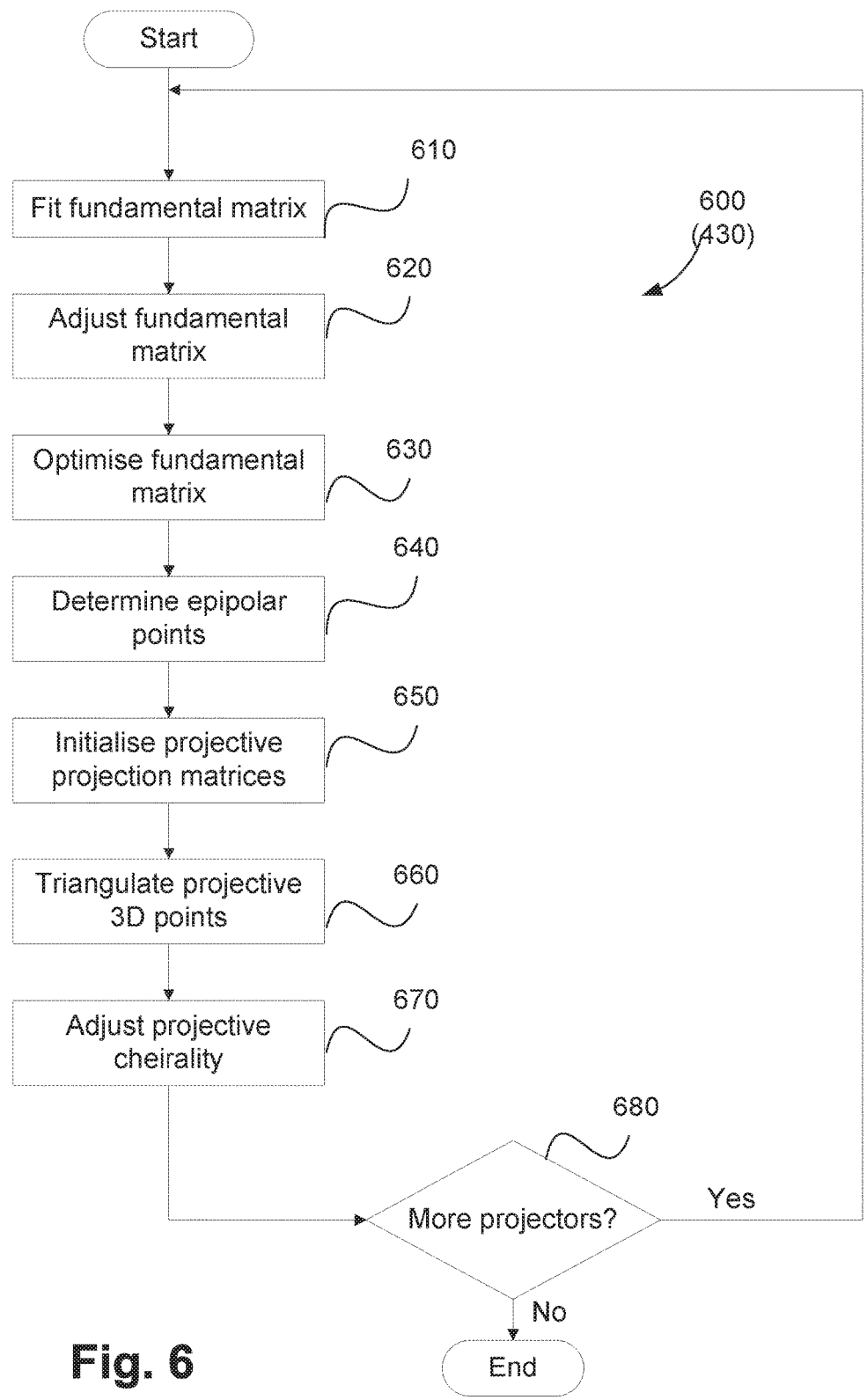
FIG. 6 is a schematic flow diagram of a method of estimating a projective reconstruction

Some steps of FIG. 6 are optional and may be excluded in some implementations. For example, steps 630 and 670 may be excluded in some implementations.

Figure 7:
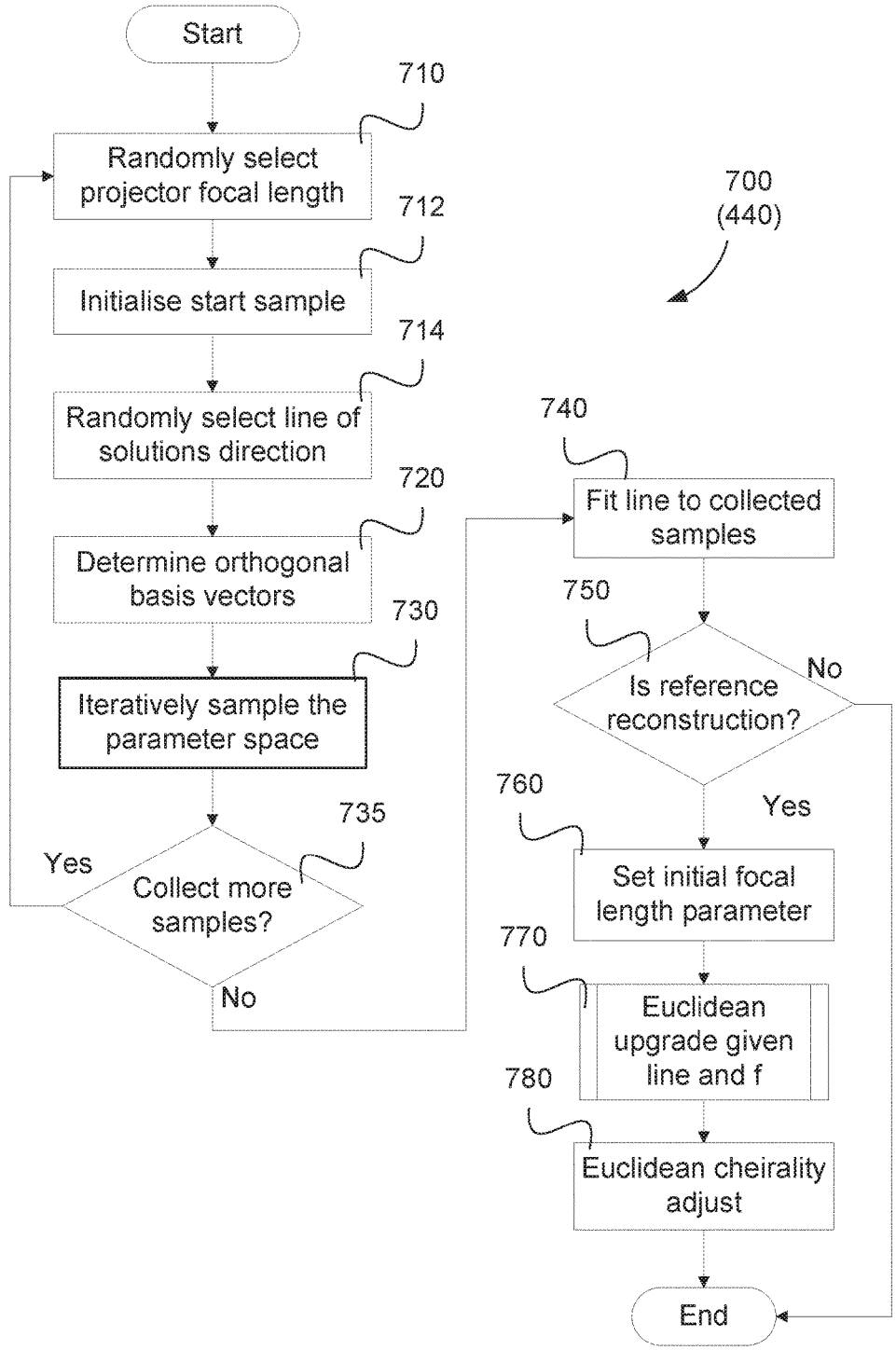
FIG. 7 is a schematic flow diagram of a method of determining a candidate set of reconstructions.

A method 700 of determining a Euclidean reconstruction, as implemented at step 440 of FIG. 4, is now described in detail with reference to FIG. 7. The method 700 operates to determine a set of candidate solutions to projector intrinsic parameters f,cx,cy. Each candidate solution in the set allows a Euclidean upgrade to the projective reconstruction determined at step 430. The set of candidate solutions resides on a line in the parameter space of the device as previously discussed. The method 700 starts at step 710 by selecting a point in the simplified parameter space $\{f,c_x,c_y\}$ of a projective device (such as the projector 111). At step 710, a projector focal length $f_{guess}$ is randomly selected from the known range $[f_{min},f_{max}]$.

The method 700 continues from step 710 to an initialisation step 712. At step 712, using known projector principal point ranges, $[cx_{min},cx_{max}]$ and $[cy_{min},cy_{max}]$, a start sample is initialised as follows:

$$(f_{start}, cx_{start}, cy_{start}) = \left(f_{guess}, \frac{cx_{max} - cx_{min}}{2}, \frac{cy_{max} - cy_{min}}{2}\right) \qquad \text{Equation (45)}$$

The method 700 continues to a determining step 714. A direction, LineDir for a line of solutions is randomly determined at 714. The method 700 continues to a determining step 720. Two orthogonal basis vectors, SearchBasis0 and SearchBasis1, that are both orthogonal to LineDir are then determined at step 720. The method 700 continues to a sampling step 730. SearchBasis0 and SearchBasis1 are used for searching a plane of the parameter space $f,c_x,c_y$ at step 730.

At step 730, the Levenberg-Marquardt optimisation (LM) algorithm is used for sampling a plane of the parameter space. Since sampling is to be performed in a plane, the projector f,cx,cy parameters cannot be sampled directly. Instead, sampling of a position (u,v) in the sampling plane is performed. Each (u,v) sample is converted to f,cx,cy values using the start sample and search basis vectors. The parameters to be optimised are:

u: sampling plane position with respect to search basis vector 0 (SearchBasis0)

v: sampling plane position with respect to search basis vector 1 (SearchBasis1)

Conversion from (u,v) sample to f,cx,cy values operates as follows:

$$(f,cx,cy)=(f_{start},cx_{start},cy_{start})+u\cdot\text{SearchBasis0}+v\cdot\text{SearchBasis1} \qquad \text{Equation (46)}$$

The optimisation at step 730 is an iterative process that refines an initial solution by minimising the value returned by a cost function. To start the LM optimisation, the start sample position is used, which corresponds to (u,v)=(0,0). The LM cost function evaluates the reprojection error of each hypothetical solution f,cx,cy. For each hypothetical solution f,cx,cy, the cost function will:

upgrade the projective reconstruction to be a hypothetical Euclidean reconstruction, project the hypothetical Euclidean reconstructed 3D points into projector and camera image planes using hypothetical projection matrices, and, measure error relative to image point observations from the set of point correspondences determined at step 420 (error is measured in both camera and projector image planes).

Figure 8:
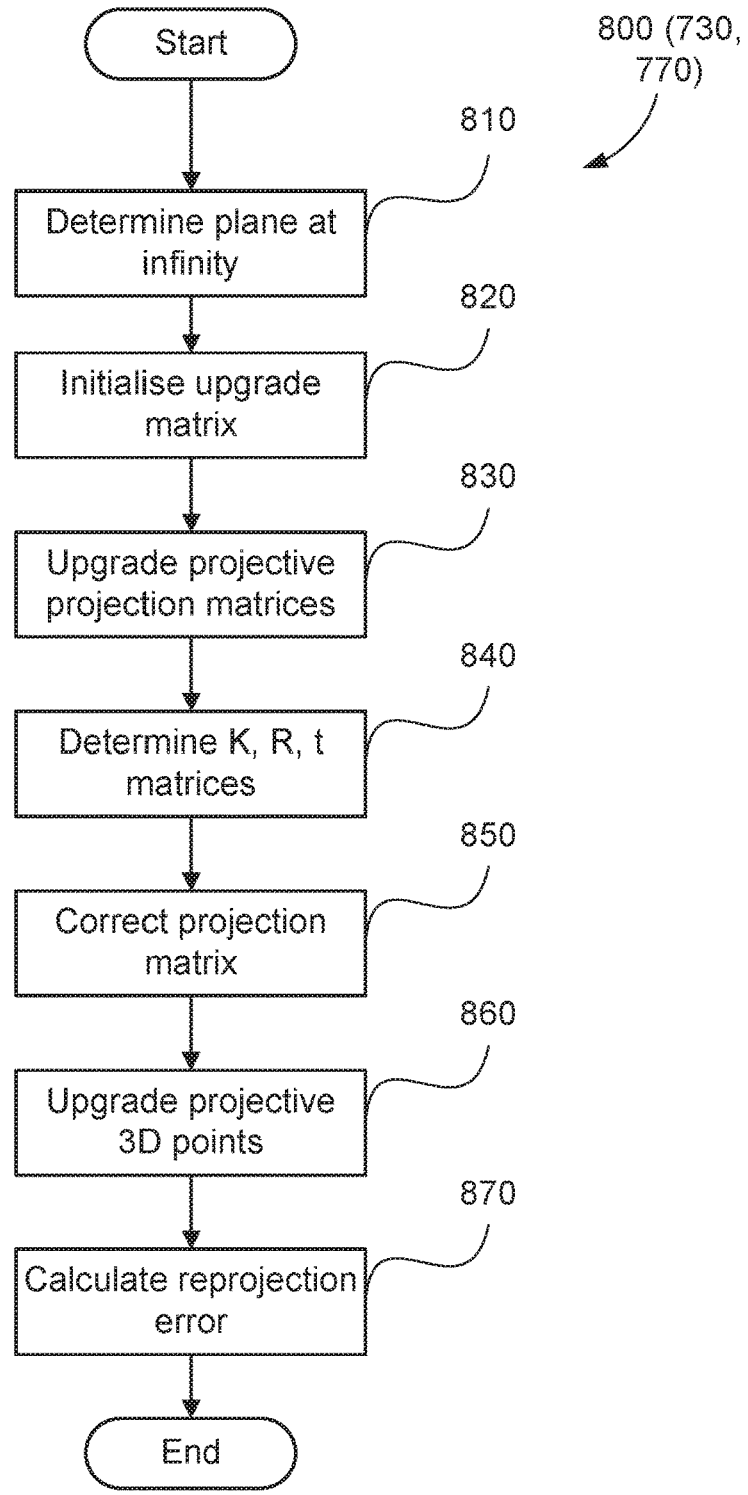
FIG. 8 is a schematic flow diagram of a method of iteratively sampling a calibration parameter space.

Implementation of the cost function is described in detail with reference to FIG. 8. Measuring reprojection error within a sampling plane of the parameter space $\{f,c_x,c_y\}$ thereby allows the minimisation step 730 to determine a candidate solution f,cx,cy within the sampling plane that corresponds to a most plausible Euclidean reconstruction within the sampling plane. The candidate solution determined at step 730 is accordingly relates to a Euclidean reconstruction based on minimisation of reprojection error between the camera 130 and the projector (such as the projector 111). In particular, the step 730 relates to a solution for minimisation of intra-reconstruction reprojection error. By obtaining a set of such candidate solutions in a sequence of parallel sampling planes parallel to the vectors SearchBasis0 and SearchBasis1, a line of candidate solutions in the simplified parameter space $\{f,c_x,c_y\}$ can be determined. The determined line in turn identifies a set of candidate Euclidean reconstructions that constrain the calibration of the projector under consideration to a subspace of the parameter space $\{f,c_x,c_y\}$.

The method 700 continues from step 730 to a determining step 735. At step 735, a test determines whether more samples should be collected. If more samples are to be collected ("Yes" at step 735), the method 700 loops back to step 710. The test of step 735 returns "No" once a predetermined number of samples have been collected. In one arrangement the predetermined number is five (5) samples. The method 700 continues form step 735 to a fitting step 740. At step 740 a line is fitted to the parameter space points determined in looped steps 710-730. The collected samples relate to a set of solutions of intrinsic parameters of the projector.

The method 700 continues from step 740 to a determining step 750. If, at step 750, the current reconstruction is determined to be the reference reconstruction ("Yes" at step 750), the method 700 continues to execute additional steps 760-780. If there is only 1 reconstruction (i.e. only 1 projector in the collection 100), then the single reconstruction is considered to be the reference reconstruction. Step 750 returns a "Yes" and additional steps 760-780 are performed using the reconstruction. If there is more than 1 reconstruction (i.e. 2 or more projectors in the collection), the first reconstruction is considered to be the reference reconstruction.

Alternatively, the reference reconstruction may be chosen using knowledge of the projection layout. For example, when there are more than 2 projections, the reconstruction corresponding to the centre-most projection may be chosen to be the reference reconstruction. Other criteria could also be used in choosing the reference reconstruction. For example, the reconstruction that has lowest reprojection error can be selected. Alternatively, the reconstruction that has the largest camera-projector baseline distance could be selected to be the reference reconstruction (with the assumption that the reconstruction that has the largest baseline distance may be more accurate than reconstructions that have smaller baseline distances).

After the line of candidate solutions has been determined, the method 700 continues to a step 760. At step 760, a focal length parameter ($f_{prj}$) value is determined for the reference reconstruction. The focal length parameter is required in order to choose an initial solution lying on the determined line of candidate solutions. In one arrangement, the initial $f_{prj}$ value is extracted from the optimised fundamental matrix F, as calculated at step 630 of the method 600 described with reference to FIG. 6. Alternatively, other means can be used such as the midpoint $$\left(f_{pri} = \frac{f_{min} + f_{max}}{2}\right)$$

of me known projector focal length range $[f_{min}, f_{max}]$.

The method 700 continues to step 770. Given the value of $f_{prj}$ and a line of candidate solutions within the simplified parameter space $\{f,c_x,c_y\}$, a Euclidean reconstruction is determined at step 770 as follows:

1. Using $f_{prj}$ and the line of solutions, a sample position $f_{prj}, cx_{prj}, cy_{prj}$ is determined.
2. Sample once at the sample position $f_{prj}, cx_{prj}, cy_{prj}$. The step 770 involves upgrading the projective reconstruction to be a Euclidean reconstruction using the determined projector intrinsic parameters $f_{prj}, cx_{prj}, cy_{prj}$. The upgrading process is described in detail later with reference to FIG. 8.

The method 700 continues to an adjusting step 780. At step 780, a cheirality adjustment is made to ensure that reconstructed Euclidean 3D points are in front of both camera and projector.

The Euclidean cheirality adjustment step 780 is performed as follows:

1. By using both positive and negative baseline vectors $t_{prj}$ and $-t_{prj}$, 2 candidate Euclidean projection matrices $P_{prj}^{E1}$ and $P_{prj}^{E2}$ are initialised for the projector:

$$P_{prj}^{E1} = K_{prj}[R_{prj}|t_{prj}] \quad \text{Equation (47)}$$

$$P_{prj}^{E2} = K_{prj}[R_{prj}|-t_{prj}] \quad \text{Equation (48)}$$

2. For each candidate projection matrix $P_{prj}^{E1}$ and $P_{prj}^{E2}$:
   a. Using 1 pair of corresponding image points, triangulate a single 3D point X. An inlier correspondence is used for the triangulation. The reconstructed point X is in the form of a 4×1 homogeneous column vector.
   b. Perform homogeneous divide (divide by element 4):

$$X = \frac{X}{X(4)} \quad \text{Equation (49)}$$

c. Test the Z value (element 3):

$X(3)>0?$

3. Choose the solution that produces positive Z value ($X(3)>0$)
4. If the second solution is chosen (i.e. corresponding to $-t_{prj}$):
   a. Update the reconstruction to use $-t_{prj}$
   b. Update the reconstruction to use $P_{prj}=K_{prj}[R_{prj}|-t_{prj}]$
   c. Scale the lambda value of the upgrade matrix H as follows:

$$H_{upgrade}(4,4)^* = -1 \quad \text{Equation (50)}$$

After Euclidean cheirality adjustment at step 780, some existing 3D points may be invalid. 3D points should be upgraded again using the adjusted upgrade matrix H, or re-triangulated from image correspondences using the cheirality of adjusted projector projection matrix.

After step 780 the method 700 ends. If step 750 determined that the reconstruction is not a reference reconstruction ("No" at 750), the method 700 ends.

A method 800 of upgrading a projective reconstruction to a Euclidean reconstruction given a candidate solution f,cx, cy, as implemented at step 770, is now described with reference to FIG. 8. The method 800 is used at various points within the algorithm, including for sampling a plane of the parameter space $\{f,c_x,c_y\}$ using LM at step 730 of the method 700 shown in FIG. 7. The method 800 upgrades a projective reconstruction to a candidate Euclidean reconstruction and calculates the reprojection error of the reconstruction with respect to corresponding camera and projector image planes. The calculated reprojection error relates to intra-reconstruction reprojection error. The reprojection error is returned to the calling method. By calling the method 800 multiple times with different candidate solution f,cx,cy, the calling method can identify a candidate solution f,cx,cy of lowest cost. At other points in the arrangements described (including step 770 of the method 700), the method 800 is invoked with the sole intention of upgrading a projective reconstruction to a Euclidean reconstruction. Determining reprojection error during invocations solely for upgrading a projective reconstruction can be optional in some arrangements.

The method 800 starts at a determining step 810. Step 810 operates to determine the plane at infinity, represented by a 3×1 column vector v. The plane at infinity is used in upgrading a projective reconstruction to be a Euclidean reconstruction. The inputs to step 810 are:
Projection matrices corresponding to a projective reconstruction. The projection matrices must be in canonical camera form—that is, $P_{cam}^P=[I|0]$ and $P_{prj}^P=[Q_{prj}|q_{prj}]$
Samples or estimates of the intrinsic matrices $K_{cam}$ and $K_{prj}$. Note that $K_{cam}$ is assigned the known (approximate) intrinsic parameters of the camera, so only $K_{prj}$ needs to be initialised using the f,cx,cy values of the current sample (candidate, hypothetical solution).

In execution of step 810, a 3×1 unit vector $\widehat{t_{prj}}$ which defines the position of the projector relative to the camera (up to a scale) is calculated as follows:

$$\widehat{t_{prj}} = \frac{K_{prj}^{-1}q_{prj}}{\|K_{prj}^{-1}q_{prj}\|} \quad \text{Equation (51)}$$

In Equation (51):
$q_{prj}$ is the rightmost 3×1 column vector of $P_{prj}^P=[Q_{prj}|q_{prj}]$; and
$\|x\|$ indicates the magnitude of vector x
A rotation matrix R* is then determined as:

$$R^*=\text{Rodrigues(axis,angle)} \quad \text{Equation (52)}$$

In Equation (52), $$\text{axis} = \widehat{t_{prj}} \times \begin{bmatrix} \|\widehat{t_{prj}}\| \\ 0 \\ 0 \end{bmatrix} \quad \text{Equation (53)}$$

$$\text{angle} = \widehat{t_{prj}} \cdot \begin{bmatrix} \|\widehat{t_{prj}}\| \\ 0 \\ 0 \end{bmatrix} \quad \text{Equation (54)}$$

x denotes the vector cross product operator and Rodrigues (axis,angle) is a function that generates a rotation matrix given rotation axis and angle using Rodrigues' Rotation Formula, as found in the OpenCV library.

The step 810 further operates so that a 3×3 matrix W is calculated as follows:

$$W = R^* K_{prj}^{-1} Q_{prj} K_{cam} \quad \text{Equation (55)}$$

In Equation (55):
W is a 3×3 matrix expression that is introduced to simplify the calculation of the plane at infinity, and contains information about the rotation of the projector relative to the camera. Specifically, rows 2 and 3 of the matrix W are orthogonal vectors from which a set of orthonormal basis vectors may be determined.
R* is the determined 3×3 rotation matrix described above
$Q_{prj}$ is the left 3×3 submatrix of $P_{prj}^P=[Q_{prj}|q_{prj}]$
Next step 810 determines a scalar s as follows:

$$s = \frac{2}{\|w_2\| + \|w_3\|} \quad \text{Equation (56)}$$

In Equation (56):
$w_2$ is row 2 of matrix W, expressed as a 3×1 column vector
$w_3$ is row 3 of matrix W, expressed as a 3×1 column vector
Finally, the plane at infinity vector v is determined as follows:

$$v = \frac{1}{\|sK_{prj}^{-1}q_{prj}\|}(((sw_2) \times (sw_3)) - (sw_1)) \quad \text{Equation (57)}$$

In Equation (57):
$w_1$ is row 1 of matrix W, expressed as a 3×1 column vector
$q_{prj}$ is the rightmost 3×1 column vector of $P_{prj}$
x denotes the vector cross product operator
The method 800 continues from step 810 to an initialising step 820. At step 820 of the method 800, the 4×4 upgrade matrix H is initialised as follows:

$$H = \begin{bmatrix} K_{cam} & \cdots & \cdots & 0 \\ \vdots & \ddots & \vdots & 0 \\ \vdots & \cdots & \ddots & 0 \\ v & \cdots & \cdots & \lambda \end{bmatrix} \quad \text{Equation (58)}$$

$$H = \begin{bmatrix} K_{cam_{11}} & 0 & K_{cam_{13}} & 0 \\ 0 & K_{cam_{22}} & K_{cam_{23}} & 0 \\ 0 & 0 & 1 & 0 \\ v_1 & v_2 & v_3 & \lambda \end{bmatrix} \quad \text{Equation (59)}$$

In Equation (59):
$v=(v_1, v_2, v_3)$ is the determined plane at infinity vector
$K_{cam_{rc}}$ is row r, column c of the known (approximate) camera intrinsic matrix $K_{cam}$
$\lambda=1$.
The method 800 continues from step 820 to an upgrading step 830. At step 830 the 3×4 Euclidean projection matrices $P_{cam}^E$ and $P_{prj}^E$ are determined from projective projection matrices $P_{cam}^P$ and $P_{prj}^P$ as follows:

$$P_{cam}^E = P_{cam}^P * H \quad \text{Equation (60)}$$

$$P_{prj}^E = P_{prj}^P * H \quad \text{Equation (61)}$$

The method 800 continues from step 830 to a determining step 840. At step 840, the Euclidean projection matrix $P_{prj}^E$ is decomposed to K[R|t] form. The K[R|t] form separates the rotation R and translation t from the camera parameters K. The decomposition may be done using the cv::decomposeProjectionMatrix function of the OpenCV library.

After the projection matrix has been decomposed, the method 800 continues to a correcting step 850. The decomposed matrix is corrected at step 850.

Correction at step 850 involves applying known constraints on the decomposed K, R and t, and determining a corrected Euclidean projection matrix for the projector by recomposing K, R and t after they have been corrected The known constraints that are applied at step 850 are as follows:
set the skew term (row 1, column 2) of $K_{prj}$ to zero (0)
apply the known aspect ratio α to focal length X and Y terms of $K_{prj}$
optionally scale the baseline (to ensure it is a certain length)
If the baseline distance is not known, as a convention, the step 850 scales the baseline distance to be 1.0
If the baseline is scaled, then the λ value of the upgrade matrix H is scaled accordingly.

If there are other known constraints, it may be advantageous to apply those constraints at step 850.

The method 800 continues from step 850 to an upgrading step 860. At step 860, the set of projective 3D points (that were triangulated at step 660 of the method 600 described in FIG. 6) are upgraded using upgrade matrix H.

Using the Euclidean upgrade matrix H, a projective 3D point $p^P$ is upgraded to a Euclidean 3D point $p^E$ as follows:

$$p^E = H^{-1} \cdot p^P \qquad \text{Equation (62)}$$

In Equation (62):
- $p^P$ is a projective 3D point in homogeneous coordinates (a 4×1 vector),
- $p^E$ is a Euclidean 3D point in homogeneous coordinates (a 4×1 vector), and
- $H^{-1}$ is the inverse of the Euclidean upgrade matrix H (a 4×4 matrix)

After projective 3D points have been upgraded to Euclidean 3D points at step 860, the method 800 continues to a determining step 870. A cost function determines reprojection error using the Euclidean 3D point set at step 870. The reprojection error is determined at step 870 as follows:
1. each Euclidean 3D point is projected into the projector image plane using $K_{prj}[R_{prj}|t_{prj}]$
2. each Euclidean 3D point is projected into the camera image plane using $K_{cam}[I|0]$
3. Euclidean distance error in image pixels is evaluated in each image plane
4. overall RMS reprojection error is determined The determined overall RMS reprojection error provides a cost value that can be employed in a minimisation process, such as the LM minimisation process performed at step 730 of the method 700. By measuring reprojection error using the arrangements described, the application 1033 quantifies how consistent the upgraded reconstruction is with image point observations in corresponding projector and camera images. The quantifying allows the minimisation step 730 to determine a solution (within the plane of the parameter space being sampled) that corresponds to a most suitable Euclidean reconstruction.

The step 450 of FIG. 4 is performed when there are 2 or more projectors, to merge Euclidean reconstructions into a common Euclidean reference frame and determine calibration parameters for one or more projectors. If there is only 1 projector (i.e. 1 Euclidean reconstruction), then no merging is performed at step 450.

The inputs to the Euclidean merge step 450 are a reference reconstruction and one or more non-reference reconstructions.

The reference reconstruction as determined at step 750 of the method 700 corresponds to 1 particular projector. Other (non-reference) reconstructions are aligned to the chosen reference reconstruction. The reference reconstruction comprises projection matrices of both the camera, and projector and 3D points formed by triangulation of camera and projector image points. In one arrangement, the reference reconstruction is assumed to have been previously calibrated, and is thus a Euclidean reference that other reconstructions may be aligned with.

In relation to the one or more non-reference reconstructions, at step 450, an $f_{prj}$ value is not required for non-reference reconstructions, as the merging process determines the $f_{prj}$ value that best aligns each non-reference reconstruction with the reference reconstruction.

The merging step 450 is an iterative procedure that is performed for each projector to be calibrated. On each iteration, a projector is selected and the projector's reconstruction is adjusted to bring the projector into alignment with the reference reconstruction. For each projector, the algorithm attempts to find the reconstruction that minimises inter-reconstruction reprojection error. In the context of the arrangements described, inter-reconstruction reprojection error relates to the component of reprojection error that is evaluated in the image plane of a device that does not correspond (belong) to the reconstruction being evaluated. For example, given a reconstruction A formed by the first projector 111 and the camera 130, and a reconstruction B formed by the second projector 112 and the camera 130, evaluation of inter-reconstruction reprojection error involves both:

Projecting reconstruction A 3D points into the image plane of the second projector 112 and evaluating resulting reprojection error. Projection matrices from reconstruction B are used to perform the projecting.

Projecting reconstruction B 3D points into the image plane of the first projector 111 and evaluating resulting reprojection error. Projection matrices from reconstruction A are used to perform the projecting.

Intra-reconstruction reprojection error need not be evaluated during projection of the reconstructions, since intra-reconstruction reprojection error is expected to be minimised for all solutions residing on the line of solutions. The step 450 accordingly relates to determining a solution from the set of solutions determined at step 440 for a first projector (such as the projector 111) according to the reprojection error with respect to a second projector (such as the projector 112). While intra-reconstruction reprojection error is usually expected to be minimised for solutions residing on the line of solutions, it is possible to minimise both inter-reconstruction reprojection error and intra-reconstruction reprojection error during the step 450. Minimising both both inter-reconstruction reprojection error and intra-reconstruction reprojection error may be advantageous, for example, if the estimated line of solutions contains some inaccuracy.

The order in which reconstructions are merged (aligned) depends on the projection layout (i.e. the spatial overlaps of projections, such as the projections 113-114 on the projection screen surface 145 and the resulting connectivity of projections). That is, projection overlap regions, such as the overlap region 120, are used to merge each non-reference reconstruction into alignment with the reference reconstruction. Accordingly, the reconstructions neighbouring the reference reconstruction are merged first by aligning the neighbouring reconstructions with the reference reconstruction. Remaining non-reference reconstructions are then merged with other non-reference reconstructions that have already been merged. Thus, calibration is propagated from the reference reconstruction to all non-reference reconstructions, thus merging all non-reference reconstructions into the Euclidean coordinate frame of the reference reconstruction. A non-reference reconstruction may be aligned to 1 or more other reconstructions that have already been aligned to the reference reconstruction.

A projector alignment (i.e. merging a reconstruction) is performed by adjusting the reconstruction using the line of solutions information determined at step 740. The reconstruction being aligned is modified. In one arrangement, the reconstruction(s) being aligned to are not be modified at step 740.

A method 900 of aligning a reconstruction B to one or more reconstructions $A_i$, as implemented at step 450, is now described with reference to FIG. 9.

Using the line of solutions information for reconstruction B (determined at step 740 of the method 700), the alignment method 900 determines a position f,cx,cy on the line of solutions. In addition to determining a solution f,cx,cy an additional scale is determined which best aligns reconstruction B to reconstruction(s) $A_i$. The additional scale parameter is determined since each reconstruction is determined up-to a scale and hence, without additional knowledge allowing determination of the scale, reconstruction B is likely to have a different scale to reconstruction(s) $A_i$. The method 900 starts at a retrieving step 910. At step 910 a reconstruction B to be aligned and reconstructions $A_i$ to be aligned to are retrieved. For example, the reconstruction B to be aligned may correspond to a projector to be calibrated as determined at step 320 of the method 300, and reconstruction(s) $A_i$ may correspond to 1 or more calibrated projector(s) of a previously calibrated system also determined at step 320.

After retrieving reconstructions, the method 900 continues to a preparing step 920. At step 920 merging data is prepared to allow efficient alignment to proceed. In particular, the following information is initialised at step 920:

1. For each reconstruction $A_i$,
   a. Retrieve the 2D-2D-3D point set $\{A_i.x0, A_i.x1, A_i.X\}$ corresponding to the $A_i$, B projection overlap region. Specifically, the 2D-2D-3D points to be retrieved are the following corresponding points:
      i. 2D camera image points (common to both reconstruction $A_i$ and reconstruction B)
      ii. 2D projector image points from reconstruction $A_i$
      iii. Euclidean 3D points from reconstruction $A_i$
   b. Retrieve the 2D-2D-3D point set $\{B.x0, B.x1, B.X\}$ corresponding to the $A_i$, B projection overlap region. Specifically, the 2D-2D-3D points to be retrieved are the following corresponding points:
      i. 2D camera image points (common to both reconstruction $A_i$ and reconstruction B)
      ii. 2D projector image points from reconstruction B
      iii. projective 3D points from reconstruction B—note that these points are projective 3D points, not Euclidean 3D points (these points will be upgraded to Euclidean 3D points during the alignment process described below)
2. Determine a mean Z value $Z_{MeanA}$ of all Euclidean 3D points $A_i.X$, for all i. The mean Z (depth) value is used to normalise reconstruction B to have the same scale as reconstruction(s) $A_i$. Z relates to the depth of the 3D point.

In summary, the data preparation step 920 involves, for each projection overlap region, determining sets of corresponding points $\{A_i.x0, A_i.x1, A_i.X\}$ and $\{B.x0, B.x1, B.X\}$, where suffix '.x0' indicates a 2D camera image point, suffix '.x1' indicates a 2D projector image point and suffix '.X' indicates a 3D reconstructed point. Additionally, a mean Z value $Z_{MeanA}$ of all 3D points of reconstructions $A_i$ is determined. The 3D points of reconstruction(s) $A_i$ are Euclidean 3D points, as reconstruction(s) $A_i$ have previously been aligned with the reference reconstruction. Additionally, the 3D points of reconstruction B are projective 3D points and require upgrade to Euclidean to bring them into alignment with the reference reconstruction.

Following data preparation at step 920, the method 900 continues to an initialising step 930. At step 930 line sampling parameters are initialised. At step 930, the following parameters are initialised:

Minimum and maximum focal length values $f_{min}$ and $f_{max}$ are initialised. For example, the focal length values are values loaded from a database at initialisation step 330 of the method 300. The focal length values determine an interval along the line of solutions of reconstruction B to be sampled.

Number of steps parameter num_steps indicating the number of positions along the line of solutions to be sampled. A larger number of steps gives a finer, more accurate sampling of the parameter space $\{f, c_x, c_y\}$ along the line of solutions between minimum and maximum focal length values $f_{min}$ and $f_{max}$. However a large number of steps will result in increased processing time. In one arrangement, num_steps=20.

Following initialisation of line sampling parameters at step 930, the method 900 continues to an upgrading step 940. A next candidate solution f,cx,cy is used to upgrade reconstruction B from a projective to a hypothetical Euclidean reconstruction at step 940. The next candidate solution f,cx,cy is determined from line of solutions information determined at step 740, minimum and maximum focal length values $f_{min}$ and $f_{max}$, and number of steps parameter num_steps. Each candidate solution f,cx,cy is determined by stepping along the line of solutions, starting at $f_{min}$ and progressing towards $f_{max}$ such that num_steps samples are taken along the sampling interval $[f_{min}, f_{max}]$. At step 940, the current candidate solution f,cx,cy is used to upgrade reconstruction B to a candidate Euclidean reconstruction. At step 940, given candidate solution f,cx,cy, the following are determined:

A 4×4 projective-to-Euclidean upgrade matrix H is determined for the reconstruction B.

Euclidean projection matrices are determined for reconstruction B.

At step 940, the determination of upgrade matrix H and Euclidean projection matrices for reconstruction B is performed in accordance with steps 810-850 as described with reference to FIG. 8.

Following Euclidean upgrade of reconstruction B given candidate solution f,cx,cy, the method 900 continues to a determining step 950. At step 950 a scale is determined that best aligns reconstruction B with reconstructions $A_i$. At step 950, the following is performed:

1. For each point set $\{B.x0, B.x1, B.X\}$ retrieved at step 910 and corresponding to a particular reconstruction
   a. Use the determined H upgrade matrix, upgrade projective 3D points B.X to hypothetical Euclidean 3D points $B.X_E$.
   b. Test and adjust cheirality of the upgraded Euclidean 3D points $B.X_E$ to ensure that they are located in front of both camera and projector. Cheirality adjustment is performed in accordance with step 780 of the method 700.
   c. Homogeneous normalise the 3D points $B.X_E$. Normalisation is performed as the 3D points $B.X_E$ are in homogeneous 4×1 column vector form. The normalisation involves dividing each point $B.X_E$ by its last element (row 4).
2. Determine the mean Z value $Z_{meanB}$ of all 3D points $B.X_E$ across all point sets.
3. Determine the scale parameter scale=$Z_{MeanA}/Z_{MeanB}$.

After the scale value has been determined at step 950, the method 900 continues to a determining step 960. A cost value is determined at step 960. Calculation of the cost value involves determining reprojection error as follows.

For each pair of corresponding point sets $\{A_i.x0, A_i.x1, A_i.X\}$, $\{B.x0, B.x1, B.X_E\}$, reconstruction B is scaled using the determined scale parameter. Both Euclidean 3D points $B.X_E$ and Euclidean projection matrices for reconstruction B are scaled at step 960.

Determining the reprojection error also comprises determining inter-reconstruction reprojection error. Determining the inter-reconstruction reprojection error involves projecting 3D points $B.X_E$ into the projector image plane of reconstruction $A_i$ and evaluating reprojection error relative to image points $A_i.x1$. The projector's projection matrix from reconstruction $A_i$ is used to perform the projection. Determining the inter-reconstruction reprojection error also comprises projecting 3D points $A_i.X$ into projector image planes of reconstruction B and evaluating reprojection error relative to image points $B.x1$. The projector's hypothetical projection matrix from reconstruction B is used to perform the projection.

The reconstruction B is scaled by 1.0/scale (i.e. undo the previous scaling).

Step 960 also comprises determining the cost value cost equal to the mean inter-reconstruction reprojection error (as determined above) for the current solution f,cx,cy. In some implementations, the cost determined at step 960 also includes intra-reconstruction reprojection error associated with a reconstruction.

After determining a cost value at step 960, the method 900 continues to a decision step 970. Execution of step 970 determines if the current candidate solution f,cx,cy is the best solution so far. If the current solution is the lowest cost solution encountered so far, ("Yes" at step 970), then method 900 continues to a storing step 980.

The solution f,cx,cy and scale and cost values, are stored at step 980 for later use, and the method 900 continues to a step 990. Otherwise, if the current solution is not the lowest cost solution ("No" at step 970), the method 900 continues to step 990.

At decision step 990, the application 1033 determines if there are more candidate solutions to be sampled along the line of solutions within the sampling interval $[f_{min}, f_{max}]$. If there are more samples to be made ("Yes" at 990), the method 900 returns back to step 940. Otherwise if there are no more samples ("No" at step 990), the method 900 continues to a repeating step 995. At step 995, the next candidate solution f,cx,cy is processed.

At step 995, the Euclidean upgrade of reconstruction B is repeated using the solution f,cx,cy of lowest cost, and scale value stored at step 980. At step 990, the following operations are performed:
1. Using the stored f,cx,cy values corresponding to the solution with lowest cost, Euclidean upgrade of reconstruction B is performed in accordance with the description of step 940 above.
2. Cheirality of the upgraded Euclidean 3D points $B.X_E$ is tested and adjusted to ensure that the points are located in front of both camera and projector. The testing and adjusting are performed in accordance with the description of step 950 above.
3. Homogeneous normalising of the Euclidean 3D points $B.X_E$. The normalising is performed in accordance with the description of step 950 above.
4. The reconstruction is scaled using the stored scale value corresponding to the solution with lowest cost. Both Euclidean 3D points $B.X_E$ and Euclidean projection matrices for reconstruction B are scaled.

After step 995 has completed, the reconstruction B is a Euclidean reconstruction that is aligned with reconstructions $A_i$. Moreover, aligned reconstruction B now contains the reconstructed Euclidean 3D points and projection matrices that produced the lowest cost (inter-reconstruction reprojection error). Additionally, the aligned reconstruction B, defines intrinsic and extrinsic parameters of the projector corresponding to reconstruction B, as determined at step 850 of the method 800 during step 995. Step 995 effectively applies the intrinsic parameters identified at step 970 to the projector to determine a Euclidean reconstruction to calibrate the projector.

The accuracy of the alignment of reconstruction B to reconstructions $A_i$ may be controlled by the number of steps parameter num_steps. One approach for achieving accurate alignment is to set the num_steps parameter to a high value, for example $num_{steps}=1000$. However, the approach using a high value can be inefficient as alignment processing may take a long time to complete. An alternative approach is to perform a coarse-to-fine sampling along the line of solutions within the parameter space $\{f,c_x,c_y\}$ for a predetermined number of samples. Using a coarse-to-fine sampling approach, a number of passes over the line of solutions are performed. The initial pass samples over the entire interval $[f_{min},f_{max}]$ of the focal length parameter. Subsequent passes sample over a smaller interval centred on the best sample from the previous pass. The coarse-to-fine sampling approach allows an initial approximate solution to be refined in an efficient manner. In one arrangement, 4 such coarse-to-fine passes may be performed.

In some scenarios, the reconstructions $A_i$ being aligned to may contain some inaccuracy. For example, inaccuracy in the reconstructions may be the case in bootstrap contexts. In such scenarios, it may be advantageous to adjust reconstructions $A_i$ in addition to reconstruction B, so as to minimise overall cost (inter-reconstruction reprojection error). In a similar way to the coarse-to-fine sampling approach, minimising cost may be achieved by performing multiple passes. In one arrangement, a number of coarse-to-fine passes are performed, with one reconstruction (one of the reconstructions $A_i$ or B) adjusted on each pass, so as to minimise overall reprojection error.

Figure 9:
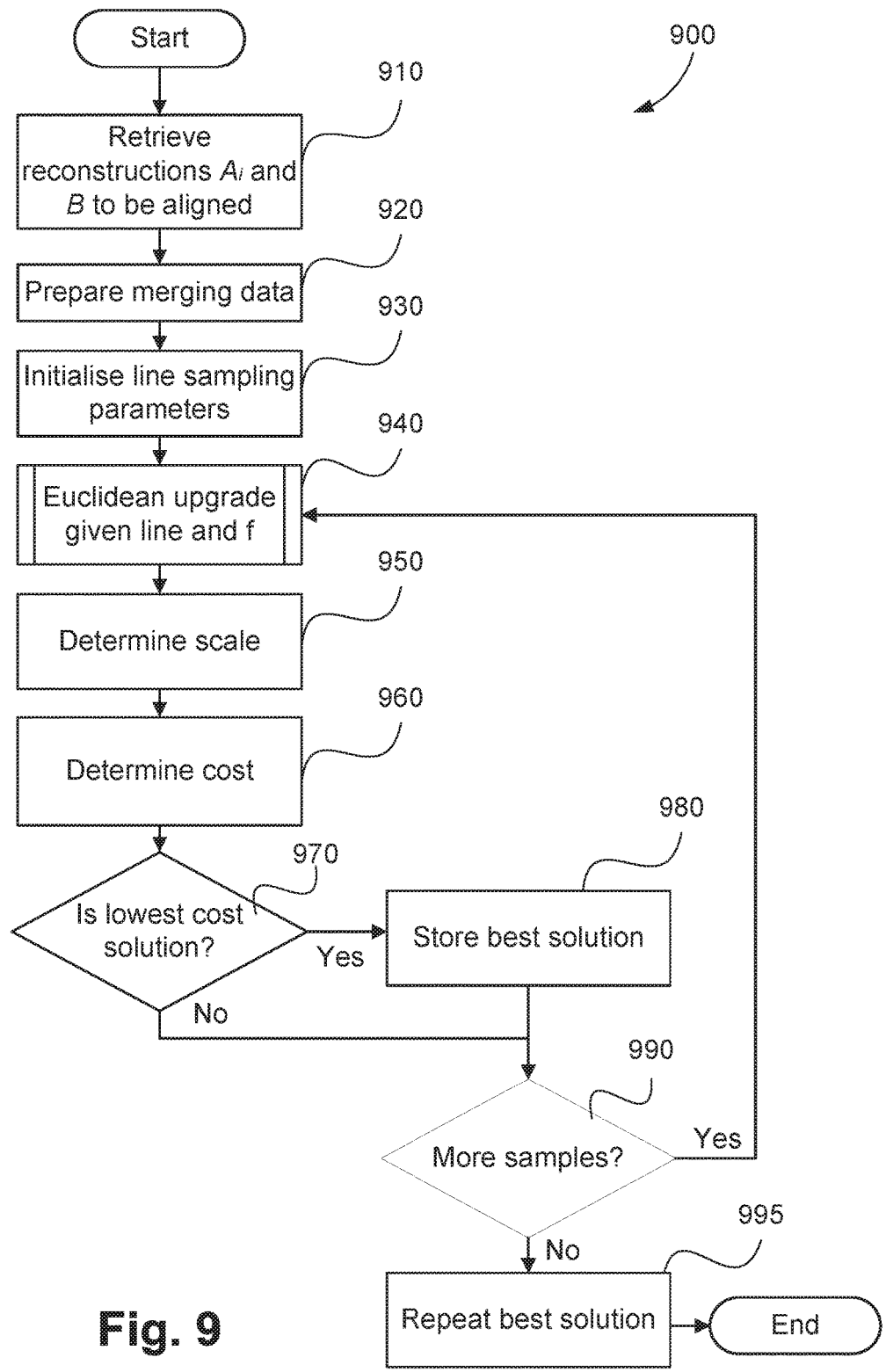
FIG. 9 is a schematic flow diagram of a method of merging reconstructions.

While the method 900 of FIG. 9 is applicable only in cases where 1 projective device (to be aligned) has an overlap region with 1 or more other projective devices (to be aligned to), the method 900 is straightforward to use the technique in an iterative algorithm to achieve alignment of sequences or grids of projective devices. For example, if aligning a sequence of three or more projections, consecutive pairs of projections must at least partially overlap. The position of the overlap is unimportant. To align a sequence, the reference reconstruction may be chosen to be a centre-most reconstruction (e.g. the reconstruction corresponding to the middle projection of a 3 projection sequence) and projections are aligned pairwise, starting from those reconstructions overlapping the reference reconstruction, and moving towards the first and last reconstructions in the sequence. For a grid of N rows by M columns of projections, consecutive pairs in each row must overlap. Consecutive pairs in each column must overlap. A grid may be aligned as follows:
1. The reference reconstruction is chosen as the reconstruction corresponding to the projection at row, column position (0, 0) (i.e. the reconstruction corresponding to the top-left projection in the grid).
2. The first row of projections is aligned pairwise, starting with the reference reconstruction and the reference reconstruction's right neighbour (0, 1), and moving towards the last reconstruction in the row.
3. The first column of projections is aligned pairwise, starting with the reference reconstruction and the reference reconstruction's neighbour (1, 0), and moving towards the last reconstruction in the column.

4. Each remaining reconstruction at position (R,C), for R>0 and C>0 is then merged with neighbours above (R−1,C) and to the left (R,C−1).

The projections of projective devices may be arranged in various configurations, not only sequences or grids. So long as each projection shares overlap with some other projection of the collection, the method 900 of FIG. 9 can be used to perform Euclidean upgrade of each non-reference reconstruction so as to achieve consistency with the chosen reference reconstruction, thus aligning each projection with its neighbouring projection(s) and achieving an overall combined projection that is aligned and consistent with the projection corresponding to the reference reconstruction.

Given an initial approximate solution for each reconstruction, a non-linear optimisation over all reconstructions, including the reference reconstruction, may be performed to refine the set of reconstructions and further minimise any residual reprojection error. For example, a bundle adjustment technique, as is commonly used in the art, may be used to perform the non-linear optimisation. In one arrangement, the method 900 of FIG. 9 can be used to obtain an initial approximate solution for each of a set of reconstructions, and the set of reconstructions may subsequently be refined using bundle adjustment to minimise overall reprojection error.

Example(s)/Use Case(s)

The arrangements described are applicable to the computer and data processing industries and particularly for the content projection industries.

The described methods are useful for the automatic calibration of collections of projectors used in wide area displays with curved surfaces. The arrangements described are especially useful when replacing or updating a single projector of a multi-projector system, for example after maintenance. The methods described, whereby all projectors in the collection define a line of solutions for a Euclidean upgrade provides a strong search constraint which allows subsequent minimisation processing to be performed efficiently to align the modified projector with the existing collection without having to perform calibration of the entire collection. The arrangements described also allow ambiguities in calibration to be resolved without the need for special charts or other physical or manual props. The method therefore allows the set up and maintenance of such projector collections to be simplified compared to previous solutions.

The invention claimed is:

1. A computer-implemented method of calibrating a projection system having a plurality of projectors, and an image capture device, the method comprising the steps of:
   capturing, using the image capture device, an image of a calibration pattern projected on to a projection surface by a first projector of the plurality of projectors;
   determining a projective reconstruction using a set of corresponding points between pixels in the captured image and pixels in the calibration pattern projected by the first projector;
   determining a set of solutions for intrinsic parameters of the first projector, the set of solutions converting the determined projective reconstruction to a candidate Euclidean reconstruction based on minimisation of reprojection error between the image capture device and the first projector, the reprojection error being determined using the set of corresponding points;
   determining intrinsic parameters of the first projector by selecting the intrinsic parameters from the identified set of solutions according to a reprojection error with respect to a second projector; and
   applying the selected intrinsic parameters to determine a Euclidean reconstruction of the projection surface to calibrate the projection system.

2. The method according to claim 1, wherein the reprojection error between the image capture device and the first projector relates to root mean square reprojection error in image planes of the image capture device and the first projector.

3. The method according to claim 1, wherein the reprojection error of the first projector with respect to the second projector relates to error between (i) a reconstruction formed by the image capture device and first projector and (ii) a reconstruction formed by the image capture device and the second projector.

4. The method according to claim 1, wherein selecting the intrinsic parameters from the identified set of solutions comprises initialising minimum and maximum focal length values of the set of solutions and an associated number of steps between the minimum and maximum focal length values.

5. The method according to claim 4, wherein selecting the intrinsic parameters from the identified set of solutions further comprises determining a Euclidian reconstruction for each of a number of reconstructions, the number of reconstructions based on the minimum and maximum focal length values and the number of steps.

6. The method according to claim 4, wherein coarse-to-fine sampling is performed between the minimum and maximum focal length values for a predetermined number of samples.

7. The method according to claim 1, wherein selecting the intrinsic parameters from the identified set of solutions comprises determining a scale based on aligning a reconstruction for each of the set of solutions for the first projector with respect to a reconstruction of the second projector.

8. The method of claim 1, wherein selecting the intrinsic parameters from the identified set of solutions comprises, for overlapping projection regions of each of the first and second projectors, determining sets of corresponding points and determining a mean depth value.

9. The method according to claim 1, wherein selecting the intrinsic parameters from the identified set of solutions comprises determining a reprojection cost for reconstructions for each of the set of solutions for the first projector with respect to a reconstruction of the second projector, the cost determined using a scale for aligning the reconstructions for each of the set of solutions with respect to the reconstruction of the second projector.

10. The method according to claim 1, wherein determining the set of solutions comprises iteratively sampling an intrinsic parameter based on reprojection error between the image capture device and the first projector, and fitting the sampled parameters to a line.

11. The method according to claim 1, wherein determining the set of solutions comprises determining a reference solution and determining a reprojection error associated with the reference solution.

12. The method according to claim 1, wherein determining the set of solutions comprises determining a reference solution and determining a cheirality of the reference solution.

13. The method according to claim 1, wherein determining the set of solutions is based on determining orthogonal vectors to a selected direction and iteratively sampling a plane position with respect to each determined vector.

14. A non-transitory computer readable medium having a computer program stored thereon to implement method of calibrating a projection system having a plurality of projectors, and an image capture device, the method comprising:
   capturing, using the image capture device, an image of a calibration pattern projected on to a projection surface by a first projector of the plurality of projectors;
   determining a projective reconstruction using a set of corresponding points between pixels in the captured image and pixels in the calibration pattern projected by the first projector;
   determining a set of solutions for intrinsic parameters of the first projector, the set of solutions converting the determined projective reconstruction to a candidate Euclidean reconstruction based on minimisation of reprojection error between the image capture device and the first projector, the reprojection error being determined using the set of corresponding points;
   determining intrinsic parameters of the first projector by selecting the intrinsic parameters from the identified set of solutions according to a reprojection error with respect to a second projector; and
   applying the selected intrinsic parameters to determine a Euclidean reconstruction of the projection surface to calibrate the projection system.

15. Apparatus configured to calibrate a projection system having a plurality of projectors, and an image capture device, comprising:
   a memory;
   a processor configured to execute code stored on the memory to:
      receive, from the image capture device, an image of a calibration pattern projected on to a projection surface by a first projector of the plurality of projectors;
      determine a projective reconstruction using a set of corresponding points between pixels in the captured image and pixels in the calibration pattern projected by the first projector;
      determine a set of solutions for intrinsic parameters of the first projector, the set of solutions converting the determined projective reconstruction to a candidate Euclidean reconstruction based on minimisation of reprojection error between the image capture device and the first projector, the reprojection error being determined using the set of corresponding points;
      determine intrinsic parameters of the first projector by selecting the intrinsic parameters from the identified set of solutions according to a reprojection error with respect to a second projector; and
      apply the selected intrinsic parameters to determine a Euclidean reconstruction of the projection surface to calibrate the projection system.

16. A system, comprising:
   an image capture device;
   a plurality of projectors, the image capture device and the plurality of projectors forming a projection system;
   a memory; and
   a processor, wherein the processor is configured to execute code stored on the memory for implementing a method of calibrating the projection system, the method comprising:
   capturing, using the image capture device, an image of a calibration pattern projected on to a projection surface by a first projector of the plurality of projectors;
   determining a projective reconstruction using a set of corresponding points between pixels in the captured image and pixels in the calibration pattern projected by the first projector;
   determining a set of solutions for intrinsic parameters of the first projector, the set of solutions converting the determined projective reconstruction to a candidate Euclidean reconstruction based on minimisation of reprojection error between the image capture device and the first projector, the reprojection error being determined using the set of corresponding points;
   determining intrinsic parameters of the first projector by selecting the intrinsic parameters from the identified set of solutions according to a reprojection error with respect to a second projector; and
   applying the selected intrinsic parameters to determine a Euclidean reconstruction of the projection surface to calibrate the projection system.

* * * * *